(12) United States Patent
Okumura et al.

(10) Patent No.: US 6,344,850 B1
(45) Date of Patent: Feb. 5, 2002

(54) IMAGE DATA RECONSTRUCTING DEVICE AND IMAGE DISPLAY DEVICE

(75) Inventors: Haruhiko Okumura, Fujisawa; Katsuya Tsuchida, Yokohama, both of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/342,264

(22) Filed: Jun. 29, 1999

(30) Foreign Application Priority Data

Jun. 30, 1998 (JP) .......................................... 10-185303

(51) Int. Cl.⁷ ................................................ G09G 5/00
(52) U.S. Cl. ...................... 345/204; 345/100; 345/101; 345/205
(58) Field of Search ................................ 345/100, 101, 345/204, 205

(56) References Cited

U.S. PATENT DOCUMENTS 5,574,476 A * 11/1996 Inoue et al. ................. 345/100
5,657,042 A * 8/1997 Inoue et al. ................. 345/100
5,715,334 A * 2/1998 Peters ........................ 382/254

FOREIGN PATENT DOCUMENTS

JP          9-90911         4/1997

* cited by examiner

Primary Examiner—Richard Hjerpe
Assistant Examiner—Jean Lesperance
(74) Attorney, Agent, or Firm—Oblon, Spivak, McClelland, Maier & Neustadt, P.C.

(57) ABSTRACT

A device receives differential data of delayed previous image data and present image data from a data transmitting section and supplies a signal corresponding to the present image data reconstructed on the basis of the differential data to a display panel section having a plurality of pixels arranged in a matrix. This device includes a holding circuit for holding image data reconstructed on the basis of the differential data received from the data transmitting section to delay the image data by a predetermined period, and an addition circuit for reconstructing the present image data by adding the previous image data delayed by the holding circuit to the differential data received from the data transmitting section.

15 Claims, 26 Drawing Sheets

| PHASE STATE | PH1 | PH2 | IMAGE DATA | PREVIOUS IMAGE DATA |
|---|---|---|---|---|
| (1) | 0 | 0 | XsYt | Xs-1Yt-1 |
| (2) | 1 | 0 | XsYt | XsYt-1 |
| (3) | 0 | 1 | XsYt | Xs+1Yt-1 |
| (4) | 1 | 1 | XsYt | Xs+2Yt-1 |

FIG. 32 — INPUT IMAGE DATA

|  | X1 | X2 | X3 | X4 | X5 | X6 | X7 | X8 | X9 | X10 | X11 | X12 | X13 | X14 | X15 | X16 |
|---|---|---|---|---|---|---|---|---|---|---|---|---|---|---|---|---|
| $Y_n$   | 1 | 0 | 1 | 0 | 1 | 0 | 1 | 0 | 1 | 0 | 1 | 0 | 1 | 0 | 1 | 0 |
| $Y_{n+1}$ | 1 | 0 | 1 | 0 | 1 | 0 | 1 | 0 | 0 | 1 | 0 | 1 | 0 | 1 | 0 | 1 |

FIG. 33 — DIFFERENTIAL DATA GENERATED BY DIFFERENTIAL DATA TRANSMITTING CIRCUIT

1H

| | $X_1/Y_n$ | $X_2/Y_n$ | $X_3/Y_n$ | $X_4/Y_n$ | $X_5/Y_n$ | $X_6/Y_n$ | $X_7/Y_n$ | $X_8/Y_n$ | $X_9/Y_n$ | $X_{10}/Y_n$ | $X_{11}/Y_n$ | $X_{12}/Y_n$ | $X_{13}/Y_n$ | $X_{14}/Y_n$ | $X_{15}/Y_n$ | $X_{16}/Y_n$ |
|---|---|---|---|---|---|---|---|---|---|---|---|---|---|---|---|---|
| INTERNAL PREVIOUS IMAGE DATA | 1 | 0 | 1 | 0 | 1 | 0 | 1 | 0 | 1 | 0 | 1 | 0 | 1 | 0 | 1 | 0 |
| IMAGE DATA ($Y_{n+1}$) | 1 | 0 | 1 | 0 | 1 | 0 | 1 | 0 | 0 | 1 | 0 | 1 | 0 | 1 | 0 | 1 |
| DIFFERENTIAL DATA ($\underline{X_i/Y_n}$) | 0 | 0 | 0 | 0 | 0 | 0 | 0 | 0 | 1 | 1 | 1 | 1 | 1 | 1 | 1 | 1 |

FIG. 34 — DIFFERENTIAL DATA GENERATED BY DIFFERENTIAL DATA TRANSMITTING CIRCUIT

1H

| | $X_1/Y_{n+1}$ | $X_2/Y_{n+1}$ | $X_3/Y_{n+1}$ | $X_4/Y_{n+1}$ | $X_5/Y_{n+1}$ | $X_6/Y_{n+1}$ | $X_7/Y_{n+1}$ | $X_8/Y_{n+1}$ | $X_9/Y_{n+1}$ | $X_{10}/Y_{n+1}$ | $X_{11}/Y_{n+1}$ | $X_{12}/Y_{n+1}$ | $X_{13}/Y_{n+1}$ | $X_{14}/Y_{n+1}$ | $X_{15}/Y_{n+1}$ | $X_{16}/Y_{n+1}$ |
|---|---|---|---|---|---|---|---|---|---|---|---|---|---|---|---|---|
| INTERNAL PREVIOUS IMAGE DATA | 1 | 0 | 1 | 0 | 1 | 0 | 1 | 0 | 0 | 1 | 0 | 1 | 0 | 1 | 0 | 1 |
| IMAGE DATA | 1 | 0 | 1 | 0 | 1 | 0 | 1 | 0 | 0 | 1 | 0 | 1 | 0 | 1 | 0 | 1 |
| DIFFERENTIAL DATA | 0 | 0 | 0 | 0 | 0 | 0 | 0 | 0 | 0 | 0 | 0 | 0 | 0 | 0 | 0 | 0 |

| | |
|---|---|
| PH1(1) | 1 |
| PH2(1) | 0 |
| PH1(2) | 0 |
| PH2(2) | 0 |
FIG. 35
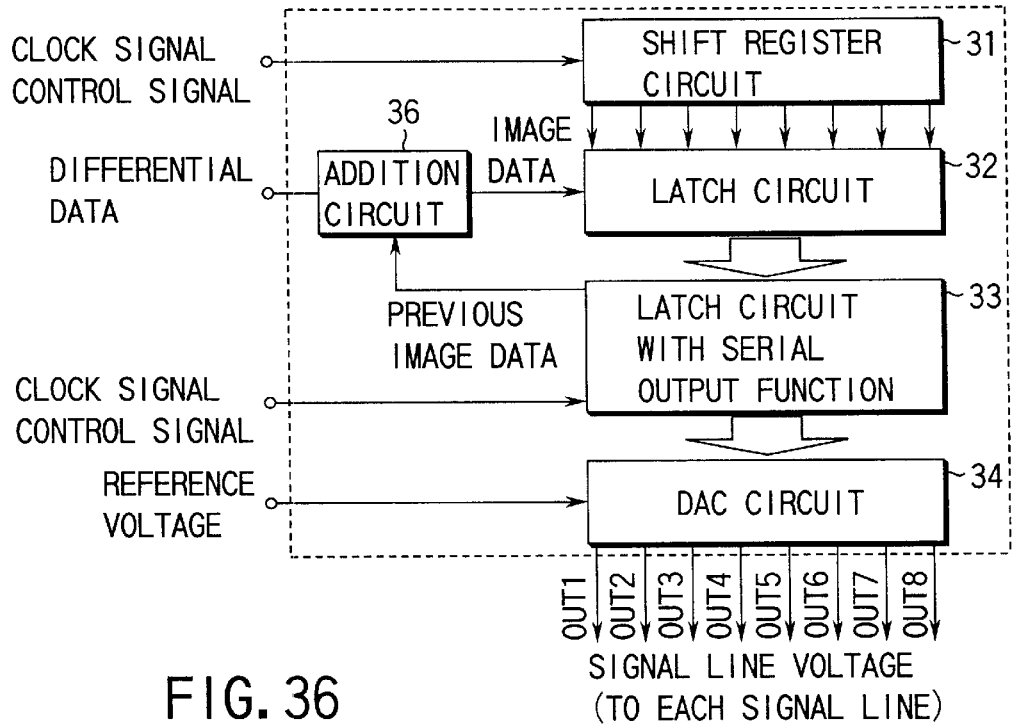
FIG. 36
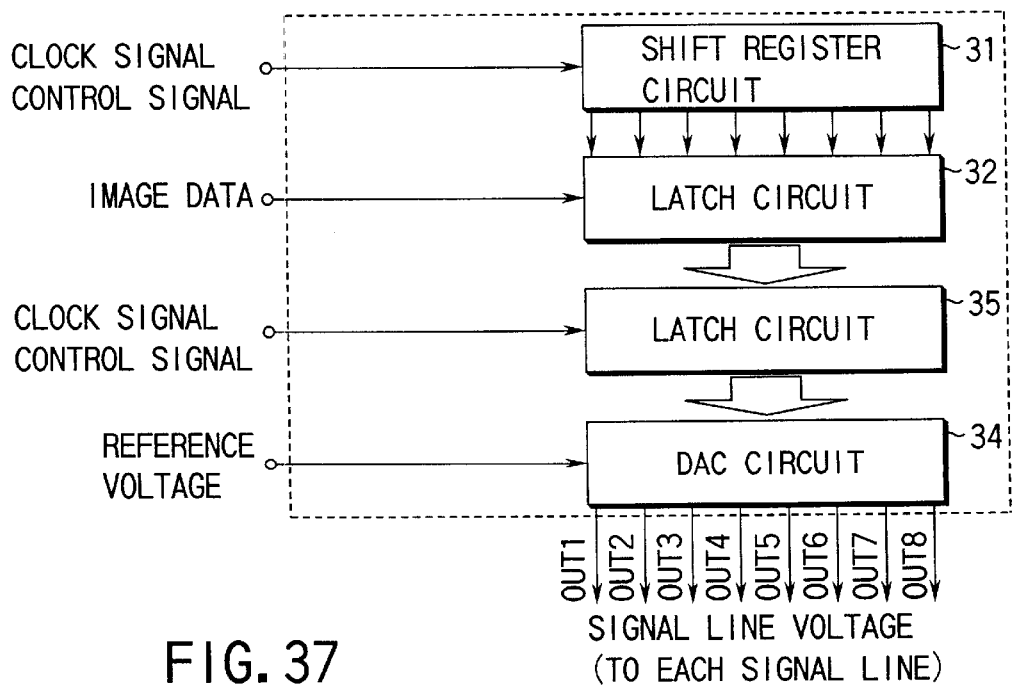
FIG. 37

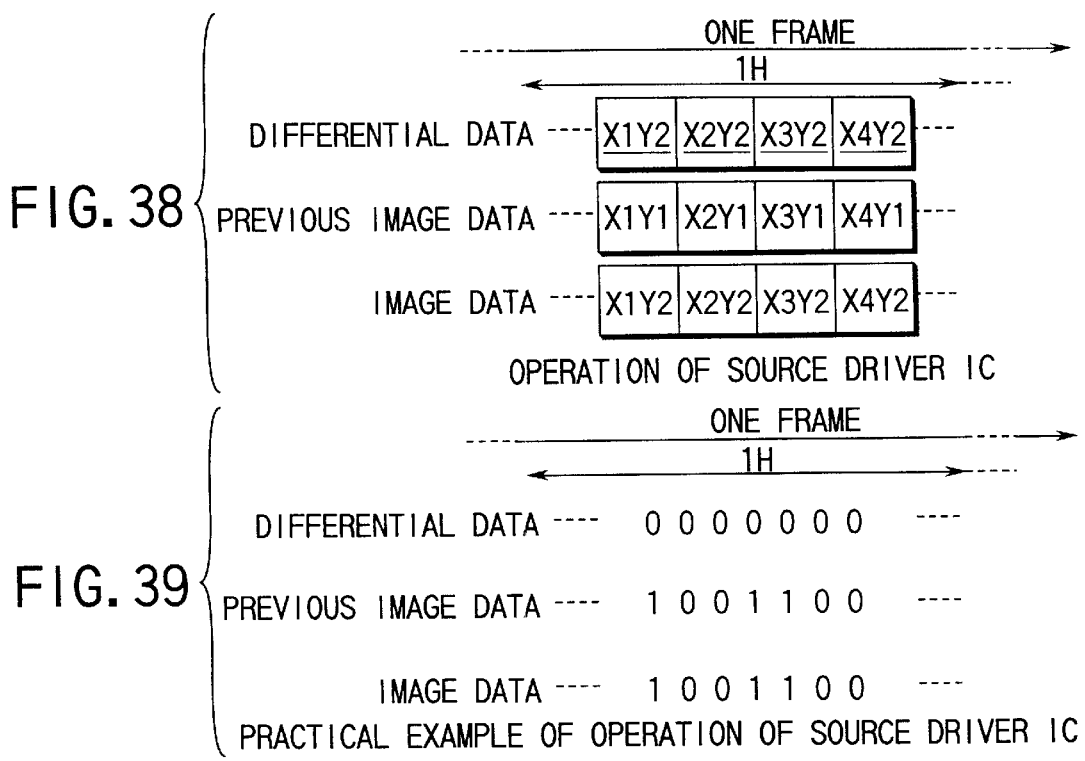
FIG. 38
FIG. 39
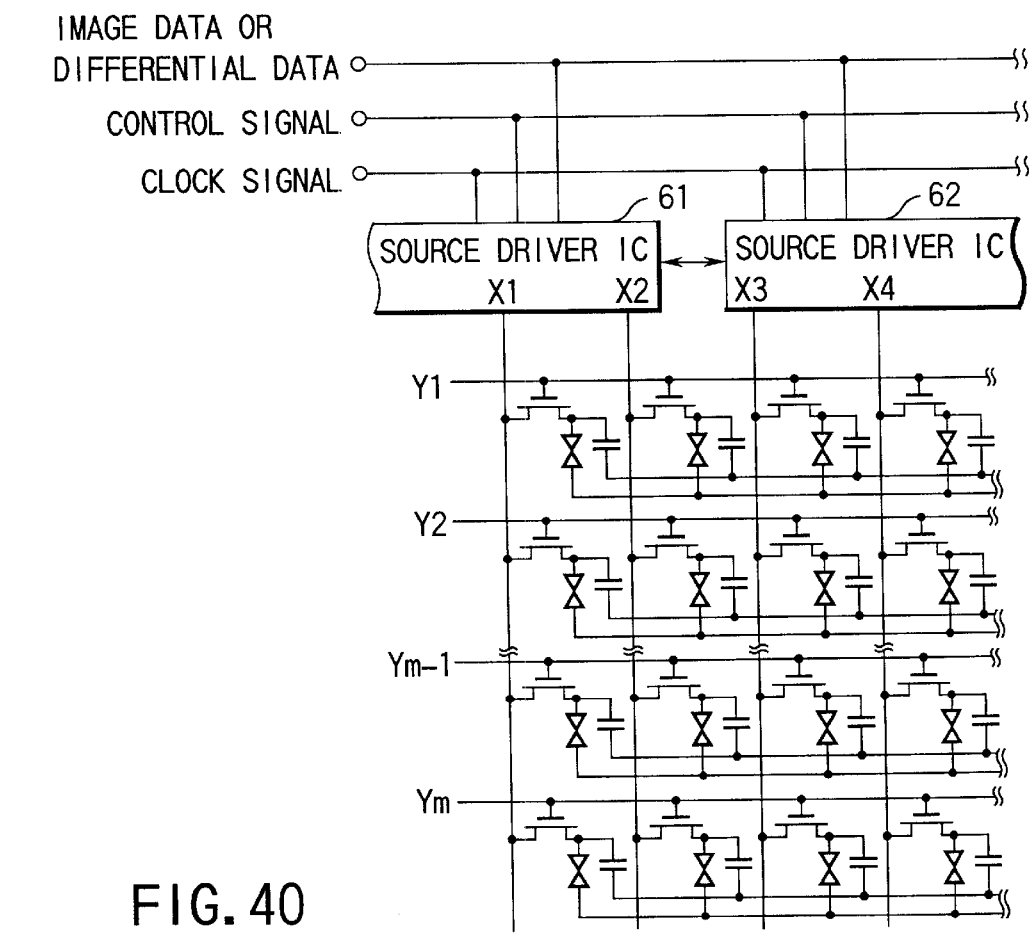
FIG. 40

FIG. 48  IMAGE DATA HELD BY LATCH CIRCUIT WITH SERIAL OUTPUT FUNCTION

{ DIFFERENTIAL DATA ---- 0 0 0 0 0 0 0 0 ---
        (OUT1) (OUT2) (OUT3) (OUT4) (OUT5) (OUT6) (OUT7) (OUT8)

PREVIOUS ---- 0 1 0 0 0 1 1 1 ---
IMAGE DATA (N3) (N4) (N5) (N6) (N7) (N8) (N9) (N10)

IMAGE DATA ---- 0 1 0 0 0 1 1 1 ---
              (X1) (X2) (X3) (X4) (X5) (X6) (X7) (X8)
          OPERATION OF ADDITION CIRCUIT

ARRANGEMENT OF OPERATIONAL AMPLIFIER

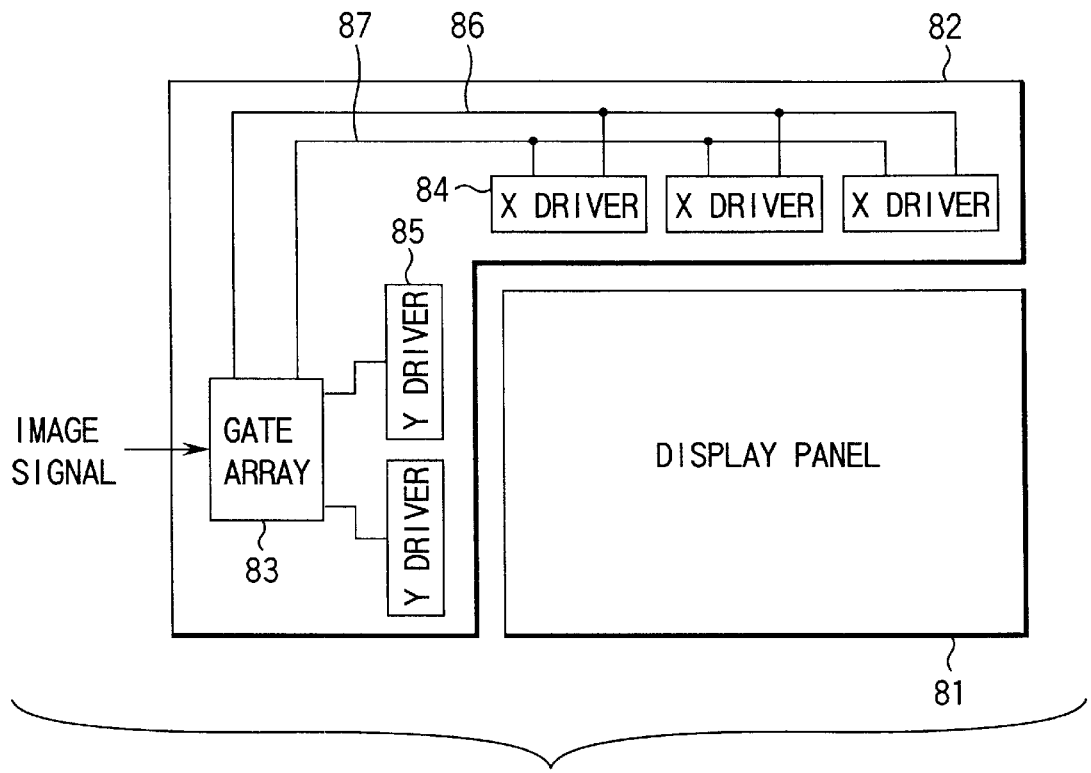
FIG. 57
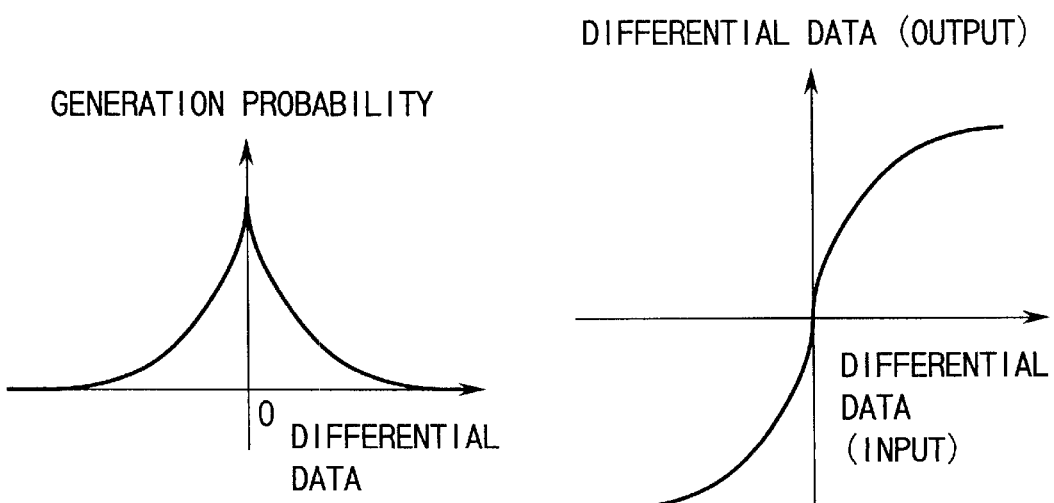
FIG. 58
FIG. 59

IMAGE DATA RECONSTRUCTING DEVICE AND IMAGE DISPLAY DEVICE

BACKGROUND OF THE INVENTION

The present invention relates to an image data reconstructing device and an image display device and, more particularly, to transmission and reception of image data in an active matrix type liquid crystal display device.

With recent increases in screen size and resolution of display devices, necessity to reduce EMI generated by electronic apparatuses having display devices is increasing (e.g., MIKKEI MICRODEVICES, April 1997, p. 20, and NIKKEI ELECTRONICS, Nov. 3, 1997 (no. 702), pp. 123–148). "LVDS", "PanelLink", "SSCG", and some other methods (e.g., NIKKEI ELECTRONICS, Nov. 3, 1997 (no. 702), pp. 123–148) have been proposed as methods of reducing EMI generated by electronic apparatuses having display devices.

Although these methods can reduce EMI, they have such problems that relatively large additional circuits are necessary, and the driving frequency rises. In "LVDS" and "PanelLink", the voltage of, e.g., image data is lowered, and the driving frequency is raised.

This requires additional dedicated ICs (e.g., DS90CF561 and DS90CF562 (National Semiconductor)). It is difficult to incorporate a function of these dedicated ICs in a panel by using polysilicon TFTs (SID96 DIGEST pp. 21–24, and SID97 DIGEST pp. 45–48) or incorporate the functions of these dedicated ICs in the existing source driver IC (e.g., source driver IC in "Data Book, LCD TFT Drivers 1997 (TEXAS INSTRUMENTS)") or a gate array without largely changing the circuit configuration.

As described above, with the increases in size and resolution of liquid crystal display devices, necessity to reduce EMI generated by transmission of image data is increasing. However, the problems such as the large increase in circuit scale and the large change in circuit configuration must be solved to reduce EMI.

BRIEF SUMMARY OF THE INVENTION

It is an object of the present invention to provide an image data reconstructing (decoding) device and an image display device capable of obtaining a satisfactory EMI reducing effect with addition of a small-scale circuit.

An image data reconstructing device according to the present invention is a device for receiving differential data of delayed previous image data and present image data from a data transmitting section and supplying a signal corresponding to the present image data reconstructed on the basis of the differential data to a display panel section having a plurality of pixels arranged in a matrix, comprising a holding circuit for holding image data reconstructed on the basis of the differential data received from the data transmitting section to delay the image data by a predetermined period, and an addition circuit for reconstructing the present image data by adding the previous image data obtained from the holding circuit to the differential data received from the data transmitting section.

In the present invention as described above, the differential data of the previous image data and the present image data is transmitted and received. The differential data is obtained by subtracting the previous image data from the present image data or vice versa. The previous image data is obtained by delaying image data by a predetermined period (e.g., about one to three pixel data periods, about one to three scanning line periods, about one to three field periods, or about one to three frame periods). The present image data and the previous image data often have a relationship as will be described later. Therefore, the number of transition times (the number of transition times from HIGH to LOW and vice versa) of the logic state of the differential data can be greatly reduced by appropriately choosing the delay period. By transmitting and receiving the differential data having this greatly reduced number of transmission times through a transmission line, EMI can be effectively reduced without largely increasing the circuit scale.

This image data reconstructing device can further comprise a delay period control circuit for changing delay period of the previous image data in accordance with a variation in a logic state of the differential data received from the data transmitting section.

The delay period for reducing the number of transition times of the differential data often varies in accordance with changes of images. Therefore, the delay period of the previous image data is properly changed such that the number of transition times of the differential data reduces. Consequently, the effect of reducing the number of transition times of the differential data can be obtained even when the image data changes.

In the image data reconstructing device, the holding circuit and the addition circuit are preferably integrated in a source driver IC for supplying a signal corresponding to the present image data reconstructed by the addition circuit to the pixel of the display panel section, and the holding circuit preferably serially supplies the previous image data to the addition circuit.

With this arrangement, the holding circuit and the addition circuit can be integrated in a source driver IC. Additionally, since the previous image data is serially supplied to the addition circuit, the addition circuit can be constructed by a few circuits.

In the image data reconstructing device, the image data reconstructing device preferably has a plurality of source drive ICs for supplying a signal corresponding to the present image data reconstructed by the addition circuit to the pixel of the display panel section, and the holding circuit and the addition circuit are integrated in each of the source driver ICs, and, dummy data is used, instead of the previous image data, when the previous image data to be supplied to the addition circuit integrated in one of the source driver IC is held by the holding circuit integrated in another source driver IC, to reconstruct the present image data by the addition circuit.

Since the present image data and the previous image data have a phase difference, a source driver IC for generating the present image data to be reconstructed is sometimes different from a source driver IC for holding the previous image data. If this is the case, external wirings to supply data need to be formed outside these source driver ICs. The use of the dummy data instead of the previous image data obviates the need for such external lines. So, the circuit area can be reduced as a whole.

In the image data reconstructing device, the holding circuit and the addition circuit can be integrated in a source driver IC for supplying a signal corresponding to the present image data reconstructed by the addition circuit to the pixel of the display panel section, and the source driver IC can hold at least one of the previous image data held by another source driver IC.

The present image data and the previous image data have a phase difference. Therefore, if a circuit for outputting the present image data to be reconstructed has the same number of bits as a circuit for holding the previous image data in the same source driver IC, the present image data cannot be reconstructed in some instances only by the same source driver IC. To reconstruct the image data by using data in another source driver IC, external wirings need to be formed outside these source driver ICs. If a source driver IC holds the previous image data held in another source driver IC, no such external lines are necessary. So, the circuit area can be reduced as a whole.

The image data reconstructing device can further comprise a supply circuit for supplying a signal corresponding to the present image data reconstructed by the addition circuit to the pixel of the display panel section, and a switching circuit for switching a driving capacity of the supply circuit in accordance with the differential data received from the data transmitting section.

By thus switching the driving capacity in accordance with the differential data, the static power consumption (particularly the static power consumption when the differential data is LOW) can be greatly reduced. As a consequence, the power consumption of the source driver IC can be reduced.

The image data reconstructing device can be constructed such that specific data is used instead of the previous image data in a specific period, and this specific data can be the same as data used instead of the previous image data in a specific period in the data transmitting section.

With this arrangement, even if an image data error occurs for some reason, normal operation can be restored within a short time by the use of the same data as the previous image data in both of the data transmitting section and the data receiving section (image data reconstructing device) in a specific period.

In the image data reconstructing device, the differential data received from the data transmitting section can be obtained by performing nonlinear conversion corresponding to generation frequency of each of original differential data for the original differential data, and the number of bits of the differential data is less than the number of bits of the original differential data, and the image data reconstructing device can further comprise a conversion circuit for performing nonlinear inverse conversion corresponding to the generation frequency of each of the original differential data for the differential data received from the data transmitting section, thereby increasing the number of bits of the received differential data.

As described above, the number of bits of the differential data can be reduced by performing nonlinear conversion/inverse conversion corresponding to the generation frequency of each of the differential data. Accordingly, the number of data transmission lines for transmitting the differential data can be reduced, so the ratio occupied by the data transmission lines in the whole apparatus can be reduced.

An image display device according to the present invention comprises a data transmitting section having a first holding circuit for holding image data to delay the image data by a predetermined period, and a sub tract ion circuit for generating differential data of previous image data obtained from the first holding circuit and present image data, a data receiving section having a second holding circuit for holding image data reconstructed on the basis of the differential data received from the data transmitting section to delay the image data by a predetermined period, and an addition circuit for reconstructing the present image data by adding the previous image data obtained from the second holding circuit to the differential data received from the data transmitting section, and a display panel section having a plurality of pixels arranged in a matrix, the display panel section receiving a signal corresponding to the present image data reconstructed by the addition circuit.

A liquid crystal display device according to the present invention comprises a data transmitting section having a first holding circuit for holding image data to delay the image data by a predetermined period, and a subtraction circuit for generating differential data of previous image data obtained from the first holding circuit and present image data, a data receiving section having a second holding circuit for holding image data reconstructed on the basis of the differential data received from the data transmitting section to delay the image data by a predetermined period, and an addition circuit for reconstructing the present image data by adding the previous image data obtained from the second holding circuit to the differential data received from the data transmitting section, and a liquid crystal display panel section having a plurality of pixels arranged in a matrix, transmittance of the pixel being controlled on the basis of a signal corresponding to the present image data reconstructed by the addition circuit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 32 is a view showing input image data in the fifth embodiment of the present invention;

FIG. 33 is a view showing differential data generated by a differential data transmitting circuit according to the fifth embodiment of the present invention;

FIG. 34 is a view showing differential data generated by the differential data transmitting circuit according to the fifth embodiment of the present invention;

FIG. 35 is a view showing the signal states of PHI and PH2 in the fifth embodiment of the present invention;

FIG. 36 is a view showing the configuration of a source driver IC according to the sixth embodiment of the present invention;

FIG. 37 is a view showing the configuration of a source driver IC as the basis of the source driver IC shown in FIG. 36;

FIG. 38 is a view showing the operation of the source driver IC according to the sixth embodiment of the present invention;

FIG. 39 is a view showing a practical example of the operation of the source driver IC according to the sixth embodiment of the present invention;

FIG. 40 is a view showing a module arrangement using source driver ICs according to the seventh embodiment of the present invention;

FIG. 48 is a view showing image data held by a latch circuit with serial output function according to the eighth embodiment of the present invention;

FIG. 57 is a block diagram showing the whole arrangement of an image display device according to the 11th embodiment of the present invention;

FIG. 58 is a graph showing the statistical generation probability of a differential signal in vertical direction;

FIG. 59 is a graph showing the conversion characteristic of differential data when nonlinear conversion is performed in the 11th embodiment of the present invention.

DETAILED DESCRIPTION OF THE INVENTION

Embodiments of the present invention will be described in detail below with reference to the accompanying drawings.

First Embodiment

Figure 1:
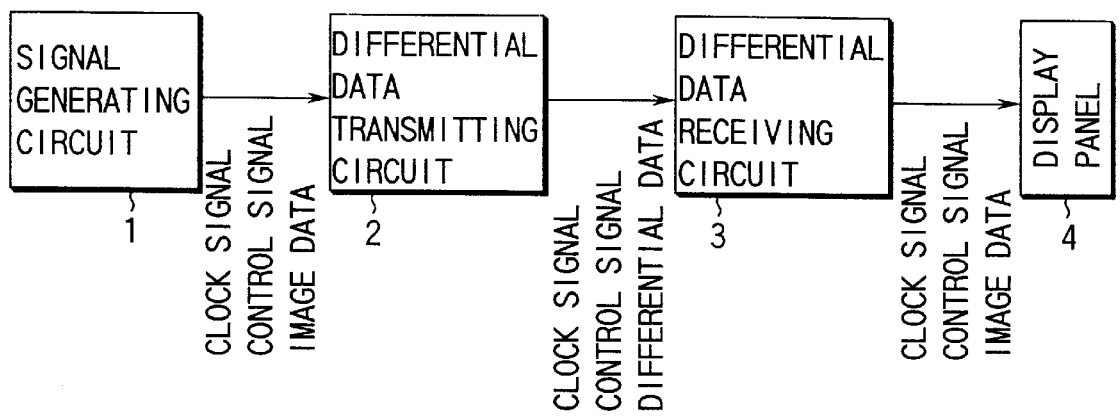
FIG. 1 is a block diagram showing the system arrangement of the first embodiment of the present invention.

FIG. 1 shows the system arrangement of the first embodiment according to the present invention. Components shown in FIG. 1 will be described below.

A signal generating circuit 1 generates various signals (clock signal, control signal, and image data) for displaying images on a display panel 4. The formats of these clock signal, control signal, and image data are presented in, e.g., timing charts in "Toshiba Liquid Crystal Display Module General Catalogue '94, pp. 13, 15, 17, and 19" (NCLK, ENAB, and R7-R0/G7-G0/B7-B0 correspond to the clock signal, control signal, and image data, respectively), or in source drivers in "Data Book LCD TFT Drivers 1997 (TEXAS INSTRUMENTS)" (CLK, EIO1/EIO2/REV and the like, and D00-D07/D10-D17/D20-D27 correspond to the clock signal, control signal, and image data, respectively). This signal generating circuit 1 is constructed of a graphics controller LSI (e.g., WD90C24A) or a gate array in a TFT module.

A differential data transmitting circuit 2 converts the image data into differential data. This differential data transmitting circuit 2 also adjusts the phases of the clock signal, control signal, and differential data so that an image is normally displayed.

A differential data receiving circuit 3 reconstructs original image data from the differential data. This differential data receiving circuit 3 also adjusts the phases of the clock signal, control signal, and image data so that an image is normally displayed.

The display panel 4 displays an image on the basis of the clock signal, control signal, and image data.

As this display panel 4, it is possible to use, e.g., LTM14C015, LTM10C025, or LTM09C020K shown in "Toshiba Liquid Crystal Display Module General Catalogue '94".

Figure 2:
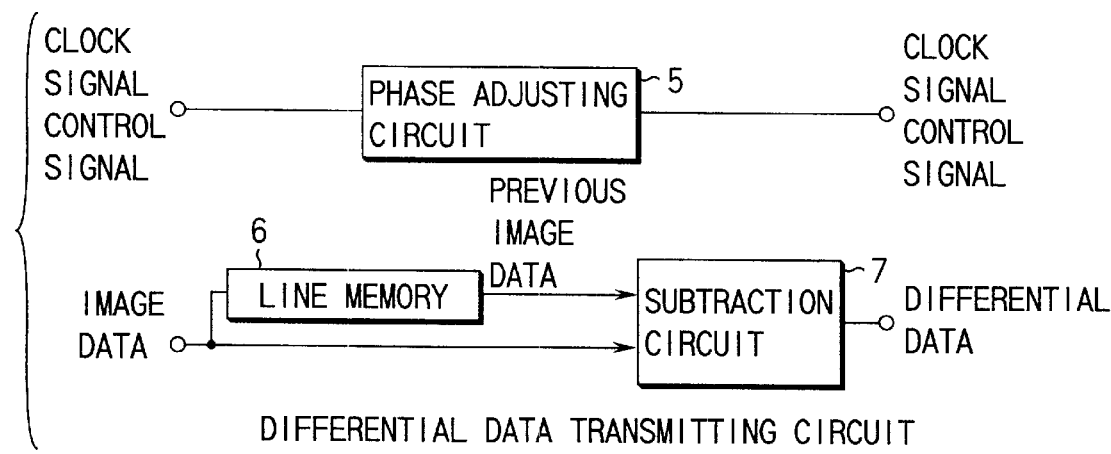
FIG. 2 is a block diagram showing the configuration of a differential data transmitting circuit according to the first embodiment of the present invention.
Figure 3:
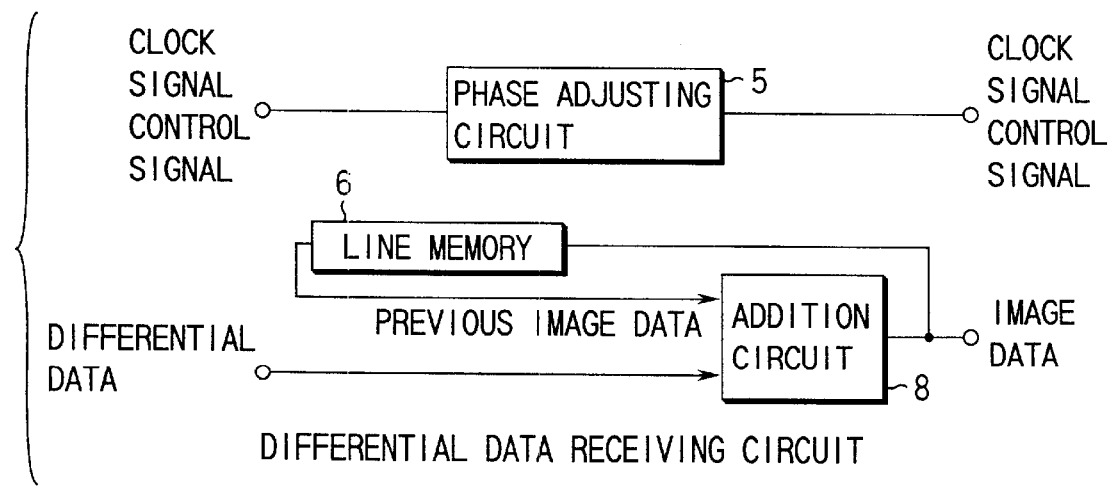
FIG. 3 is a block diagram showing the configuration of a differential data receiving circuit according to the first embodiment of the present invention.

FIG. 2 shows the configuration of the differential data transmitting circuit. FIG. 3 shows the configuration of the differential data receiving circuit 3.

A phase adjusting circuit 5 (FIG. 2) adjusts the phases of the clock signal, control signal, and image data such that an image is normally displayed. Analogously, a phase adjusting circuit 5 (FIG. 3) adjusts the phases of the clock signal, control signal, and differential data such that an image is normally displayed.

A line memory 6 (FIG. 2) holds image data supplied from the signal generating circuit 1 and outputs image data (previous image data) obtained by delaying the image data from the signal generating circuit 1 by a predetermined period. That is, this line memory 6 outputs image data having a phase which lags behind the phase of the image data supplied from the signal generating circuit 1.

A line memory 6 (FIG. 3) holds image data supplied from an addition circuit 8 and outputs image data (previous image data) obtained by delaying the image data from the addition circuit 8 by a predetermined period. That is, this line memory 6 outputs image data having a phase which lags behind the phase of the image data supplied from the addition circuit 8.

For example, the line memory 6 (FIG. 2 or 3) holds image data for one scanning line period (a scanning line period is equivalent to, e.g., a scanning time or a horizontal display period described in "Toshiba Liquid Crystal Display Module General Catalogue '94"), thereby delaying the image data from the signal generating circuit 1 or the addition circuit 8 by one scanning line period.

A subtraction circuit 7 generates differential data from the image data and the previous image data. The addition circuit 8 generates image data from the differential data and the previous image data.

Figure 4:
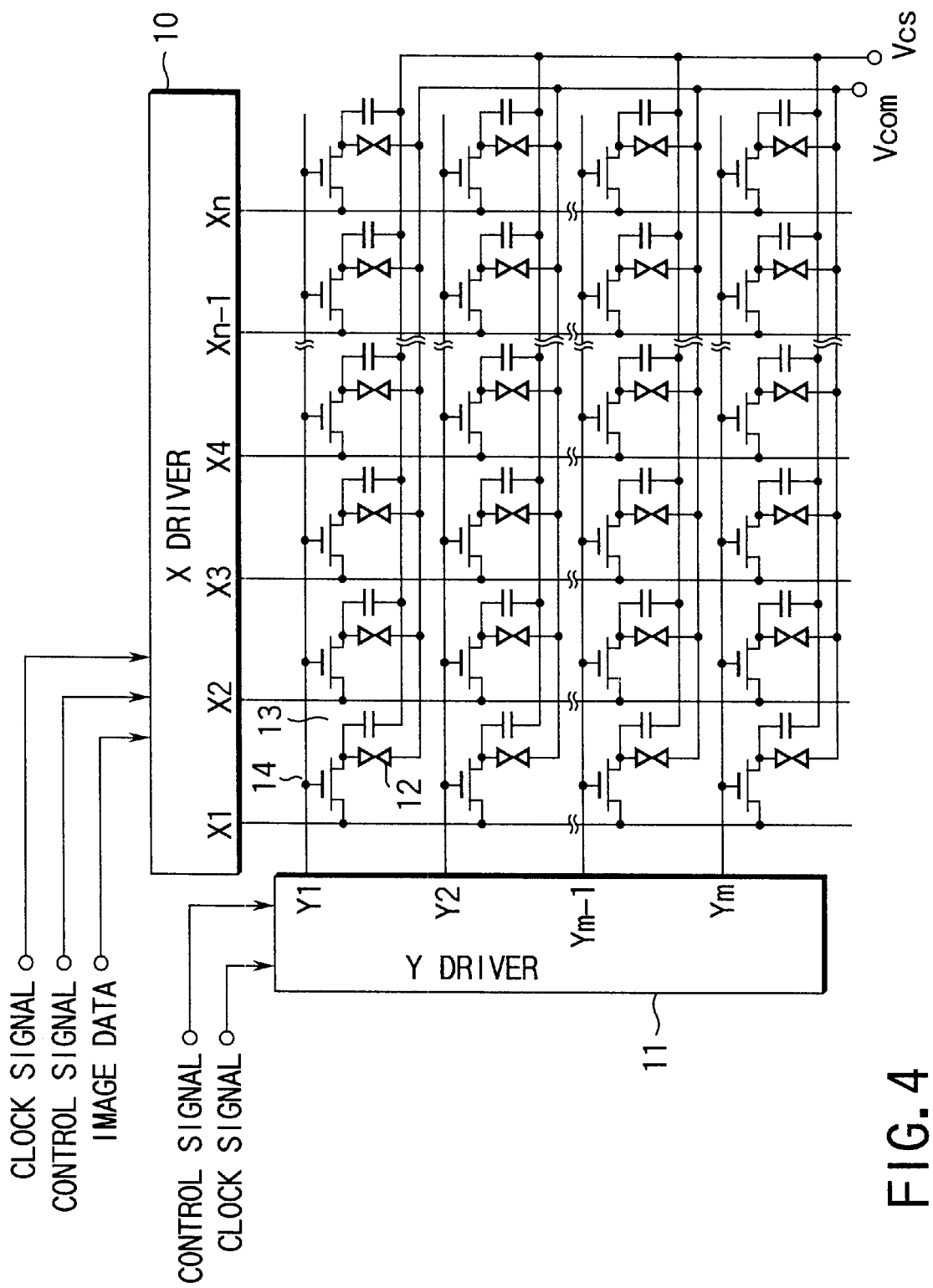
FIG. 4 is a block diagram showing the arrangement of a display panel according to the first embodiment of the present invention.

FIG. 4 shows the arrangement of the display panel 4 when a TFT-LCD is used as the display panel.

An X driver 10 can be constructed by, e.g., source driver described in "Data Book LCD TFT Drivers 1997 (TEXAS INSTRUMENTS)" or polysilicon and the like (SID96 DIGEST pp. 21–24 and SID97 DIGEST pp. 45–48).

A Y driver 11 can be constructed by, e.g., gate driver described in "Data Book LCD TFT Drivers 1997 (TEXAS INSTRUMENTS)" or polysilicon and the like (SID96 DIGEST pp. 21–24 and SID97 DIGEST pp. 45–48).

Liquid crystal capacitors 12, auxiliary capacitors 13, TFTs 14, signal lines X1 to Xn, and gate lines Y1 to Ym are described in NIKKEI BP CORP., "Flat Panel Displays 1990–1998".

FIGS. 5 to 25 show practical examples of the present invention.

Figure 5:
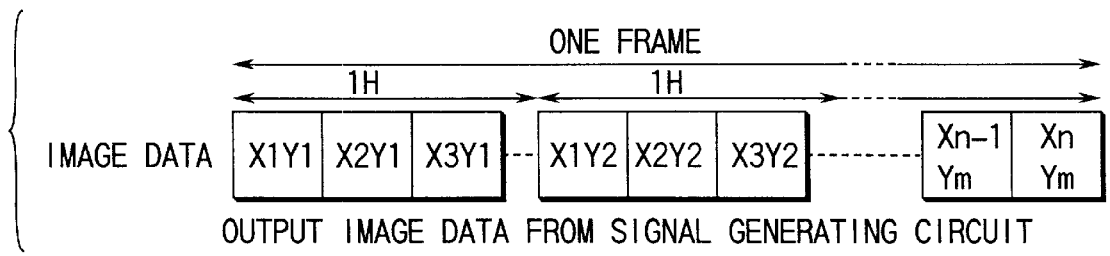
FIG. 5 is a view showing output image data from a signal generating circuit according to the first embodiment of the present invention.

In FIG. 5 and the like, 1H indicates one scanning line period. One frame is equivalent to, e.g., a frame period or a vertical display period described in "Toshiba Liquid Crystal Display Module General Catalogue '94".

Figure 6:
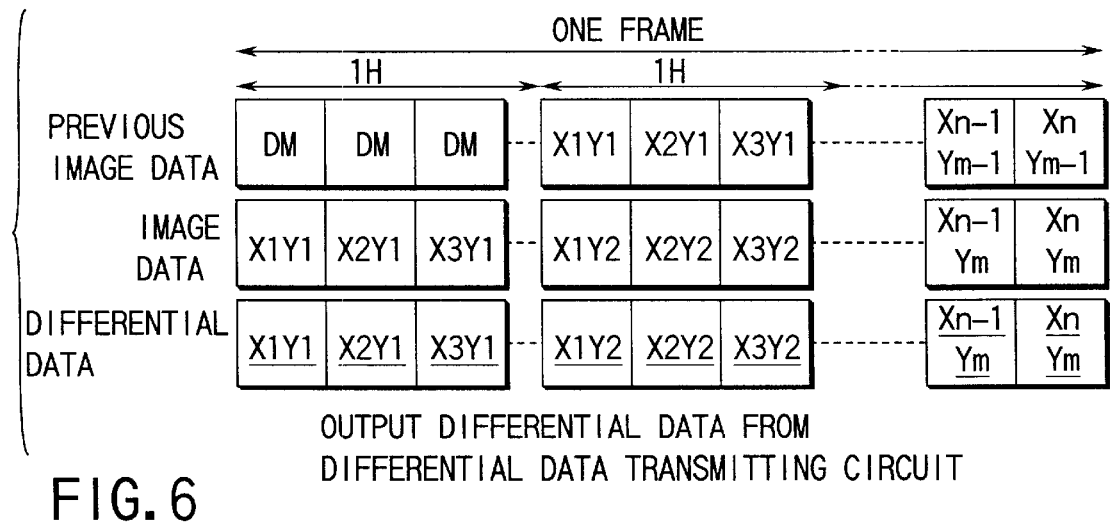
FIG. 6 is a view showing output differential data from the differential data transmitting circuit according to the first embodiment of the present invention.

In FIG. 5 and the like, X1Y1 indicates image data corresponding to a pixel controlled by the signal line X1 and the gate line Y1. In FIG. 6 and the like, X1Y1 indicates differential data corresponding to the pixel controlled by the signal line X1 and the gate line Y1.

Figure 8:
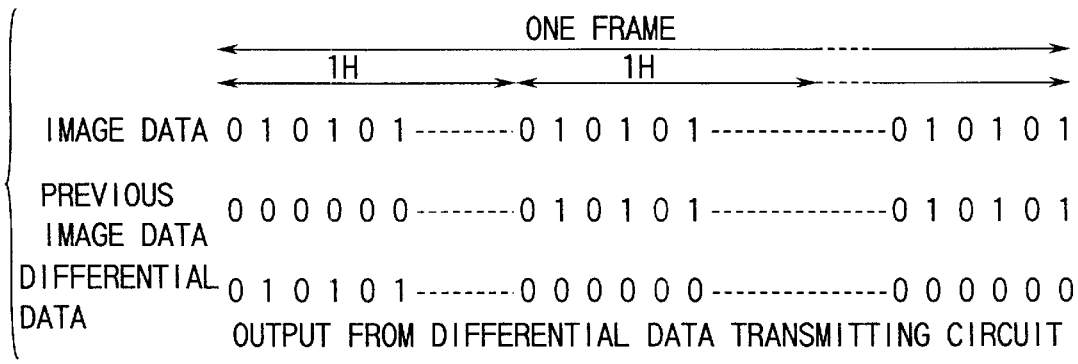
FIG. 8 is a view showing an output from the differential data transmitting circuit according to the first embodiment of the present invention.

In FIG. 8 and the like, "0" and "1" indicate that the differential data, image data, and previous image data are LOW and HIGH, respectively, as digital signals. Note that the image data shown in FIGS. 8 to 11, 15, and 16 is a simple repetitive signal unless otherwise specified.

Image data processing in the first embodiment will be described in detail below.

Output image data (FIG. 5) from the signal generating circuit 1 is supplied to the differential data transmitting circuit 2. The subtraction circuit 7 in this differential data transmitting circuit 2 generates differential data from the image data and previous image data. For example, the relationship between the image data and the previous image data is as shown in FIG. 6.

Referring to FIG. 6, the line memory 6 outputs the previous image data with a delay of one scanning line period. The subtraction circuit 7 generates the differential data by exclusively ORing the previous image data and the image data. If the image data is X1Y1–XnY1, X1Ym–XnYm can be used as the previous image data. In the example shown in FIG. 6, however, dummy data DM (in this example, a LOW signal) is used as the previous image data.

Figure 7:
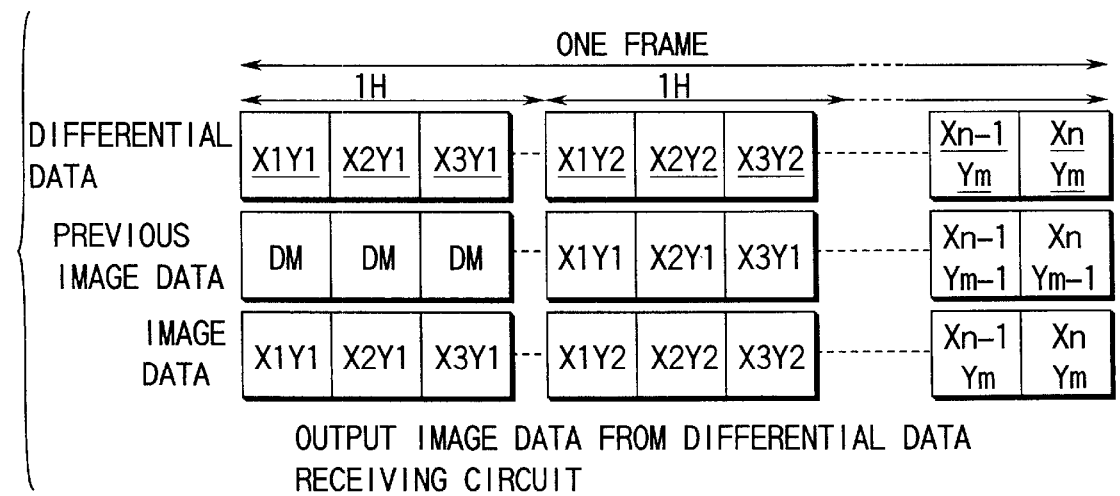
FIG. 7 is a view showing output image data from the differential data receiving circuit according to the first embodiment of the present invention.

The output differential data from the differential data transmitting circuit 2 is supplied to the differential data receiving circuit 3. The addition circuit 8 in this differential data receiving circuit 3 reconstructs the image data by exclusively ORing the previous image data and the differential data. The timings and the like of the differential data, previous image data, and image data are as shown in FIG. 7.

Figure 9:
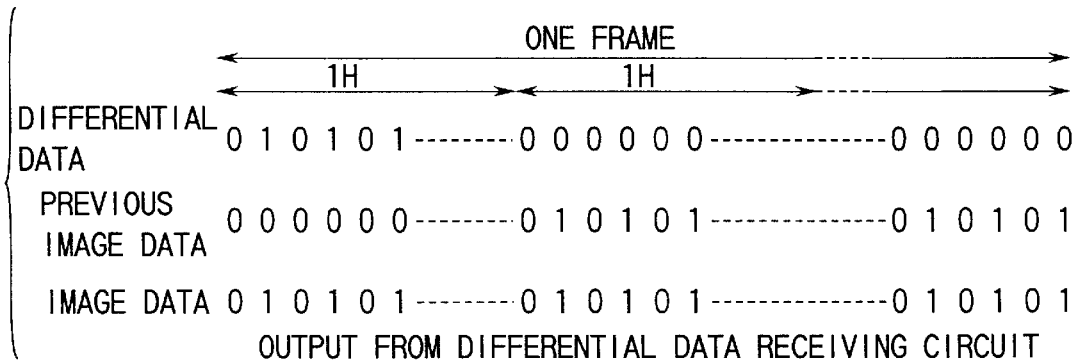
FIG. 9 is a view showing an output from the differential data receiving circuit according to the first embodiment of the present invention.

For example, when image data shown in FIG. 8 (a pattern which displays black and white on alternate signal lines) is used, the differential data is LOW in almost one frame period. Therefore, data transition (change of data from HIGH to LOW or vice versa) of the differential data decreases sharply compared to that of the image data. FIG. 9 shows reconstruction of the image data shown in FIG. 8. FIG. 9 indicates that the image data is exactly reconstructed.

Figure 10:
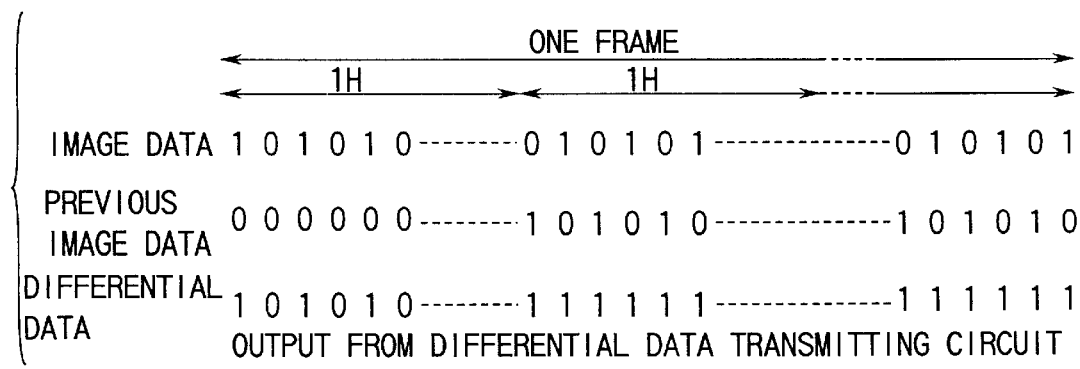
FIG. 10 is a view showing an output from the differential data transmitting circuit according to the first embodiment of the present invention.

This holds for image data shown in FIG. 10 (a checker display pattern). That is, the differential data is HIGH in almost one frame period, and its data transition decreases sharply compared to that of the image data.

In the present invention, the differential data is used in the signal transmitting section in which the cable length is large and electromagnetic radiation is a problem. Consequently, the electromagnetic radiation intensity, consumption power, and the like can be greatly reduced compared to a case where the image data is used. Note that the previous image data is delayed one scanning line period on the basis of the fact that changes in image data are small in the vertical direction in ordinary display images (e.g., the Internet, games, mails, and documents). The aforementioned transmission method is called a vertical differential transmission method.

Second Embodiment

Figure 11:
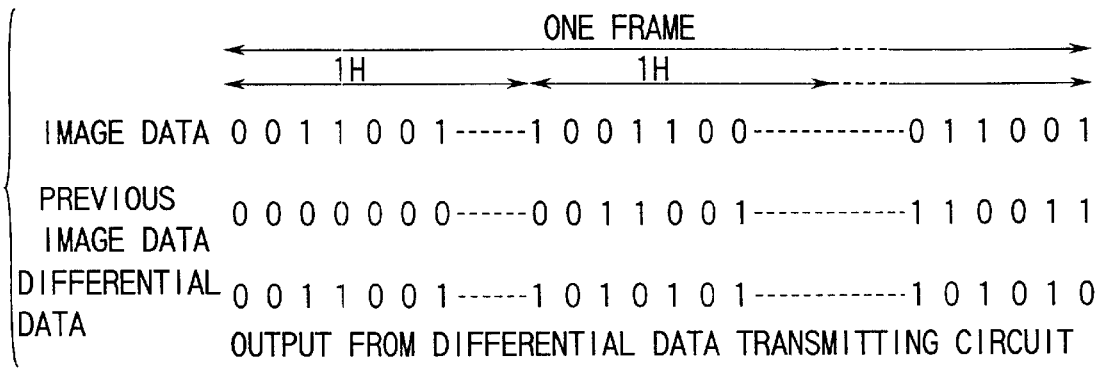
FIG. 11 is a view showing an output from the differential data transmitting circuit according to the second embodiment of the present invention.
Figure 12:
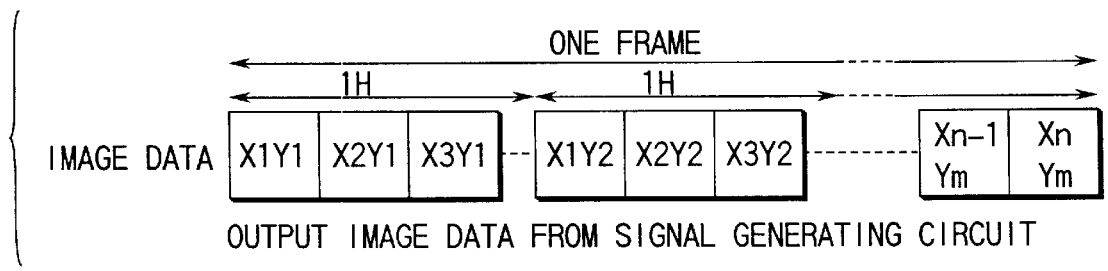
FIG. 12 is a view showing output image data from a signal generating circuit according to the second embodiment of the present invention.

The method of the above first embodiment is effective to most display patterns. However, when special image data as shown in FIG. 11 is used, the number of transition times of differential data becomes larger than that of the image data. This second embodiment solves this problem. Details of image data processing in the second embodiment will be described below.

Output image data (FIG. 12) from a signal generating circuit 1 is supplied to a differential data transmitting circuit 2. A subtraction circuit 7 in this differential data transmitting circuit 2 generates differential data from the image data and previous image data. For example, the relationship between the image data and the previous image data is as shown in FIG. 13.

Figure 13:
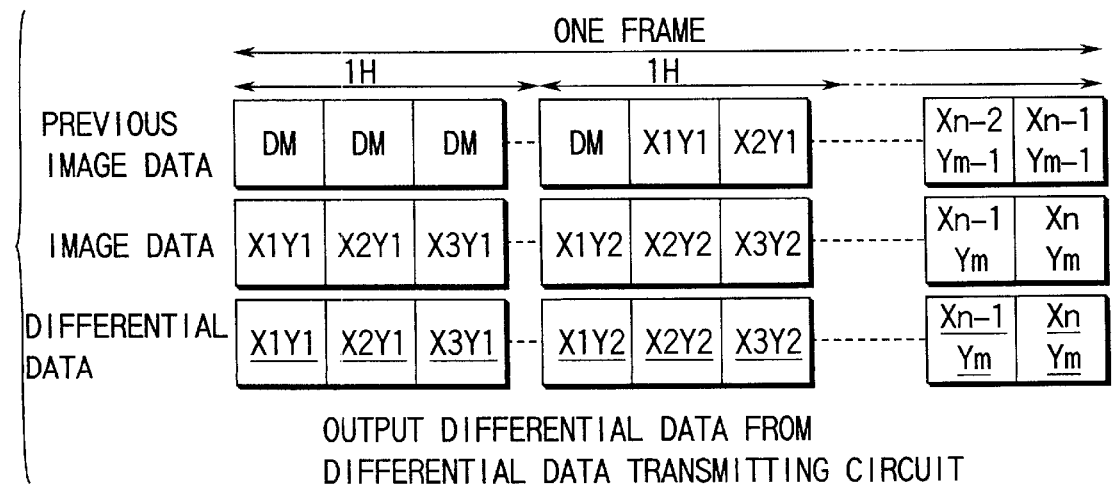
FIG. 13 is a view showing output differential data from a differential data transmitting circuit according to the second embodiment of the present invention.

Referring to FIG. 13, a line memory 6 outputs the previous image data with a delay of (one scanning line period + one image data period). The subtraction circuit 7 generates the differential data by exclusively ORing the previous image data and the image data. If the image data is X1Y1–XnY1 and X1Y2, XnYm−1 and X1Ym–XnYm can be used as the previous image data. In the example shown in FIG. 13, however, dummy data DM (in this example, a LOW signal) is used as the previous image data.

Figure 14:
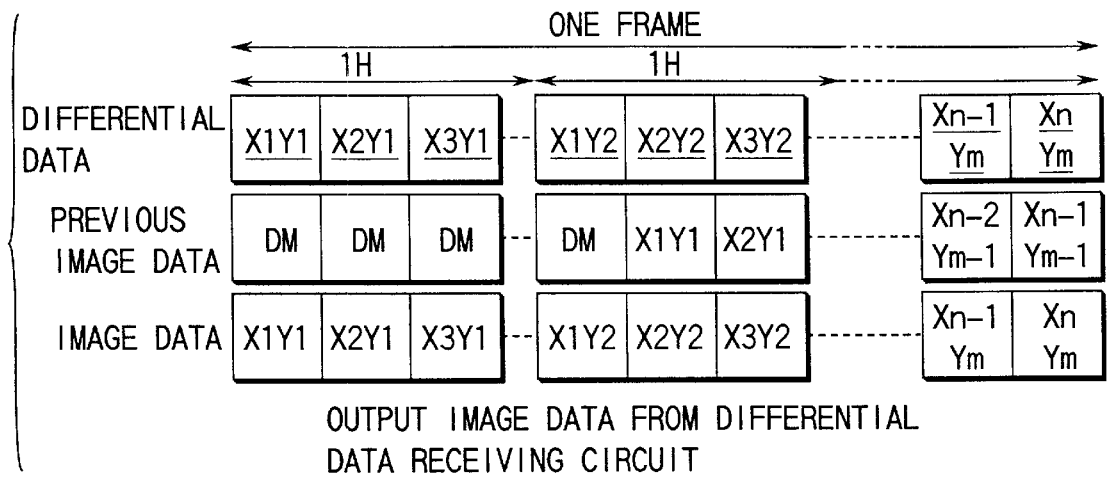
FIG. 14 is a view showing output image data from a differential data receiving circuit according to the second embodiment of the present invention.
Figure 15:
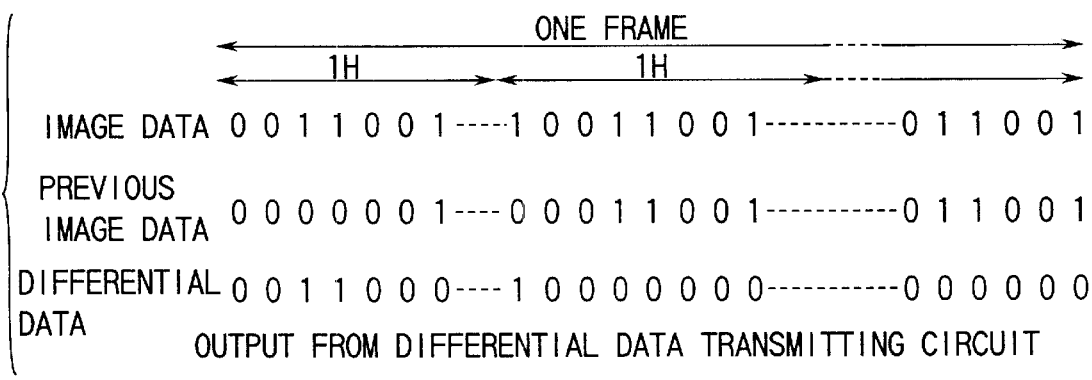
FIG. 15 is a view showing an output from the differential data transmitting circuit according to the second embodiment of the present invention.

The output differential data from the differential data transmitting circuit 2 is supplied to a differential data receiving circuit 3. An addition circuit 8 in this differential data receiving circuit 3 reconstructs image data as shown in FIG. 14 by exclusively ORing the previous image data and the differential data. FIG. 15 shows the output from the differential data transmitting circuit 2. That is, even when the image data as shown in FIG. 11 is used, this embodiment can reduce the number of transition times of the differential data. Also, this embodiment is of course effective to the image data shown in FIGS. 8 and 10.

Note that the phase difference between the image data and the previous image data need not be (one scanning line period + one image data period). That is, the phase difference between the image data and the previous image data is desirably adjusted in accordance with a display pattern so as to further reduce the number of transition times of the differential data. To reduce the circuit scale, the phase difference is preferably (one scanning line period + one image data period).

Third Embodiment

Figure 16:
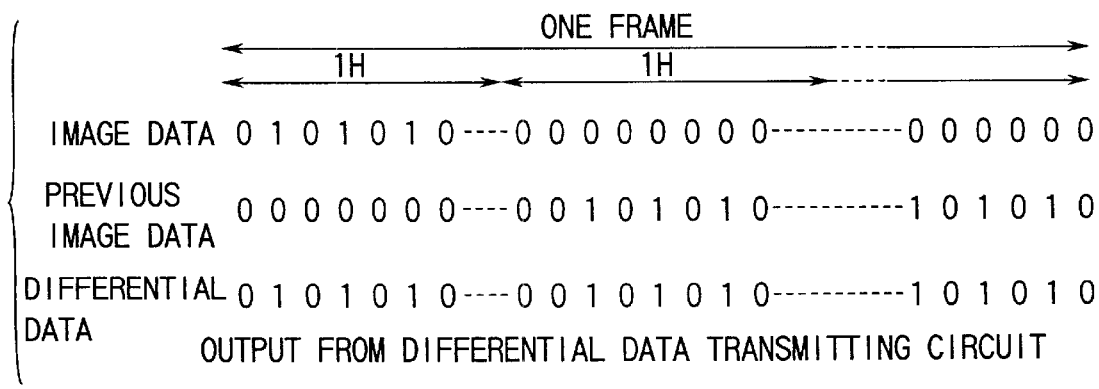
FIG. 16 is a view showing an output from the differential data transmitting circuit according to the third embodiment of the present invention.
Figure 17:
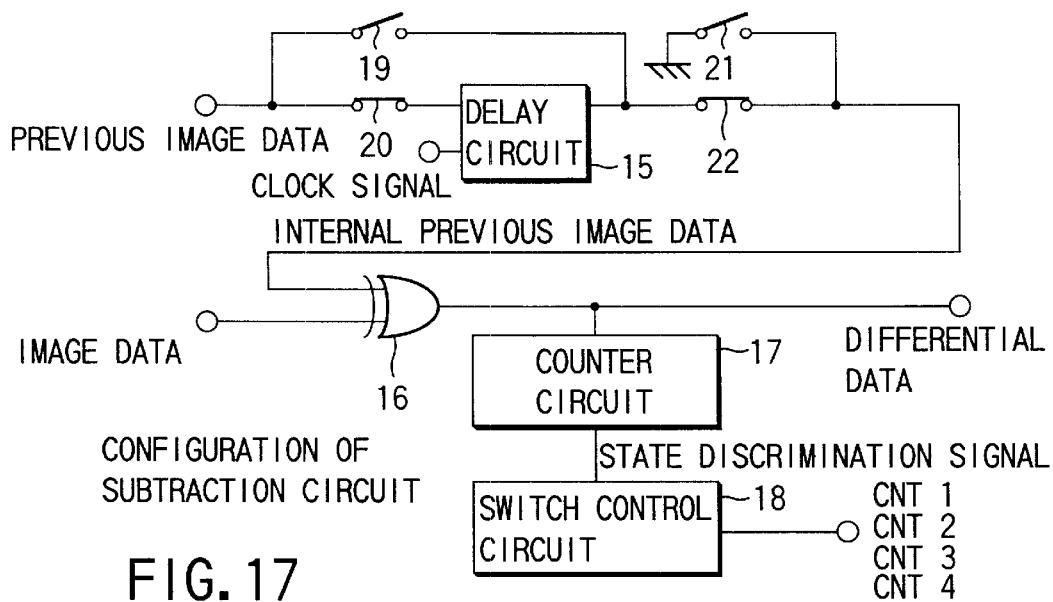
FIG. 17 is a view showing the configuration of a subtraction circuit according to the third embodiment of the present invention.

The methods described in the first and second embodiments are effective to most of the display patterns. However, when special image data (which transits for each pixel in an odd-number 1H period and is LOW in all pixel in an even-number 1H period) as shown in FIG. 16 is used, the number of transition times of differential data becomes larger than that of the image data. This embodiment solves this problem FIG. 17 shows the configuration of a subtraction circuit 7 of this embodiment. This subtraction circuit 7 can be constructed by discrete elements, monolithic ICs, polysilicon TFTs, or the combination of these elements.

A delay circuit 15 is constructed of, e.g., a D type flip-flop (e.g., TC74HC74AP) and an inverter and has a function of delaying image data by one pixel data period.

An EX-OR circuit 16 is constructed of, e.g., an exclusive OR circuit (e.g., TC74HC86AP).

A counter circuit 17 is constructed of a counter circuit (e.g., TC74HC163AP) and a logic circuit. This counter circuit 17 counts the number of transition times of differential data and supplies a state discrimination signal corresponding to the number of transition times to a switch control circuit 18.

The switch control circuit 18 has a function of generating signals CNT1 to CNT4 for controlling switches 19 to 22 in accordance with the state discrimination signal. These signals CNT1, CNT2, CNT3, and CNT4 ON/OFF-control the switches 19, 20, 21, and 22, respectively. That is, the ON/OFF states of the switches 19 to 22 are determined on the basis of the number of transition times of the differential data. Each of these switches 19 to 22 is constructed of, e.g., TC74HC4066AP.

This third embodiment will be described in detail below. In the following description, assume that a line memory outputs previous image data with a delay of one scanning line period.

Figure 19:
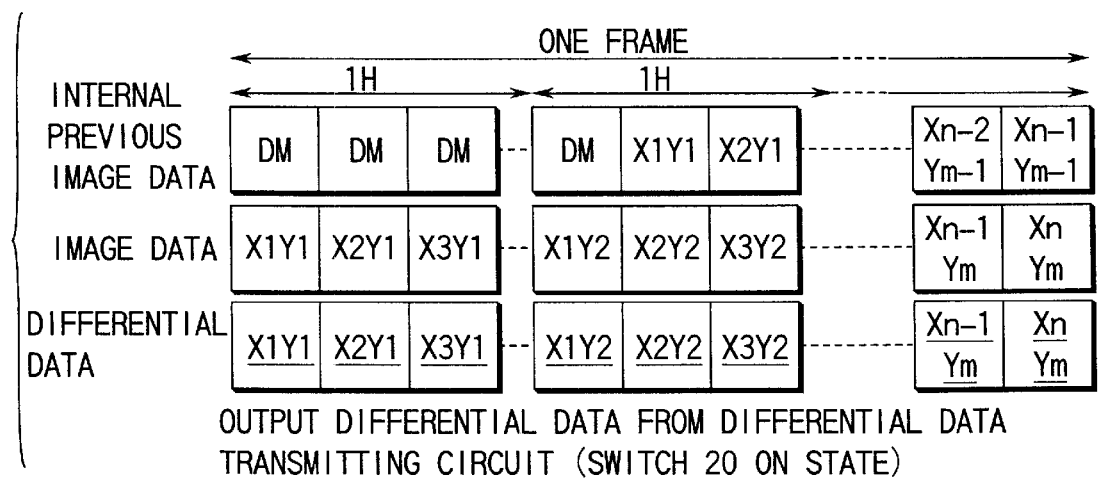
FIG. 19 is a view showing output differential data from the differential data transmitting circuit according to the third embodiment of the present invention.
Figure 20:
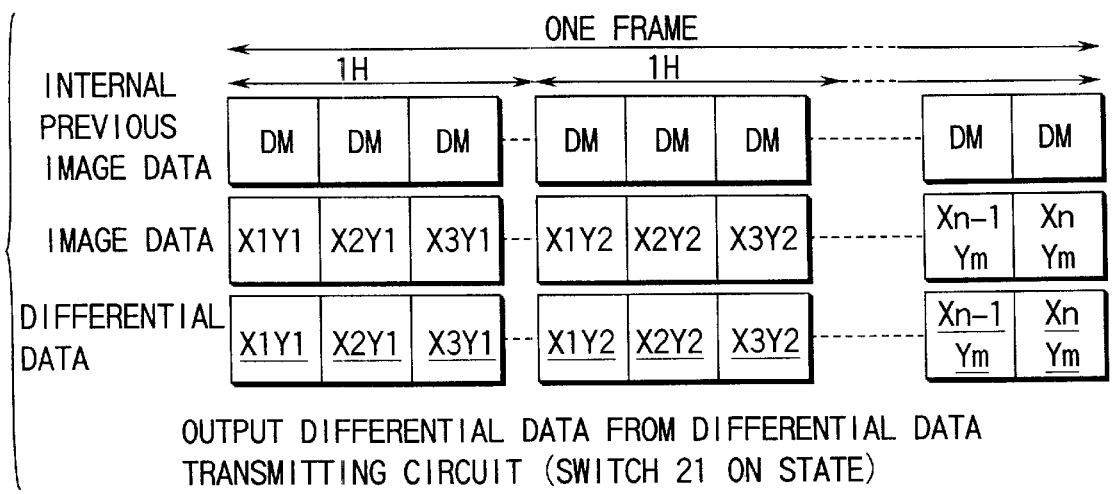
FIG. 20 is a view showing output differential data from the differential data transmitting circuit according to the third embodiment of the present invention.
Figure 21:
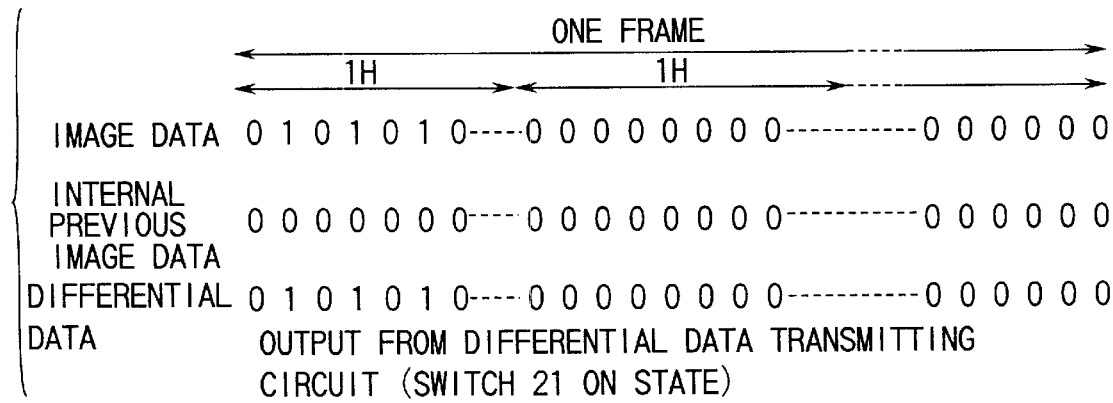
FIG. 21 is a view showing an output from the differential data transmitting circuit according to the third embodiment of the present invention.

Output image data (FIG. 5) from a signal generating circuit 1 is supplied to a differential data transmitting circuit 2. An internal subtraction circuit 7 of this differential data transmitting circuit 2 generates differential data from the image data and the previous image data. The relationship between the image data and internal previous image data shown in FIG. 17 is as shown in FIGS. 18, 19, or 20 in accordance with the transition state of the differential data.

Figure 18:
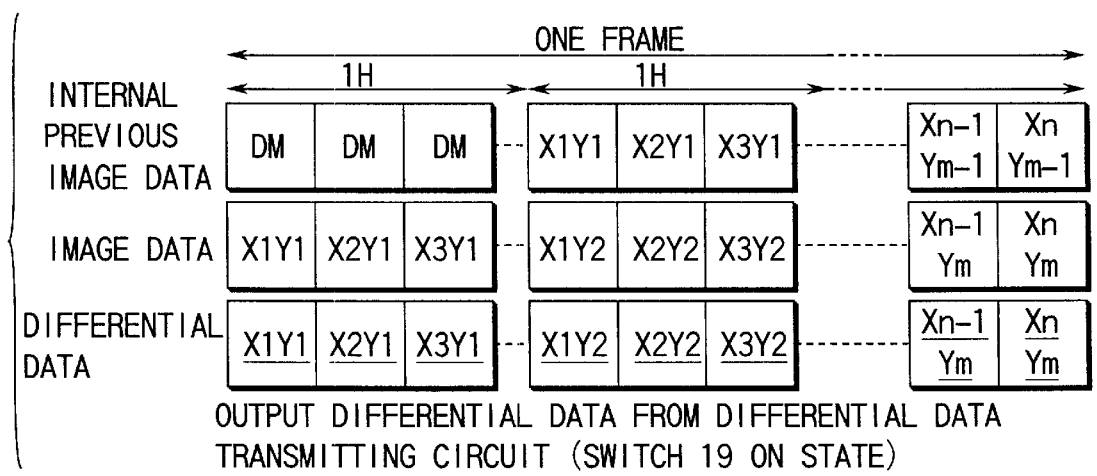
FIG. 18 is a view showing output differential data from a differential data transmitting circuit according to the third embodiment of the present invention.

In FIG. 18, the switches 19 and 22 shown in FIG. 17 are ON, and the switches 20 and 21 are OFF. The phase difference between the internal previous image data and the image data is one scanning line period (this state will be referred to as a "switch 19 ON state" hereinafter). In FIG. 19, the switches 20 and 22 shown in FIG. 17 are ON, and the switches 19 and 21 are OFF. The phase difference between the internal previous image data and the image data is (one scanning line period+one image data period) (this state will be referred to as a "switch 20 ON state" hereinafter). In FIG. 20, the switches 21 and 22 shown in FIG. 17 are ON and OFF, respectively, and dummy data DM (LOW in this embodiment) is output as the internal previous image data (this state will be referred to as a "switch 21 ON state" hereinafter).

Assume that the image data shown in FIG. 11 is input when the subtraction circuit is in the switch 19 ON state. If this is the case, the differential data is almost a repetitive signal of "0" and "1", and EMI abruptly increases. The counter circuit 17 checks whether the number of state discrimination transition times of the differential data (the number of transition times of the differential data in an arbitrary period (e.g., the number of transition times in a 1H period or one frame period); in this embodiment, the number of transition times in a 2H period) exceeds a certain set value (in this embodiment, the number n of horizontal pixels). Since the number of transition times obviously exceeds the set value (U state), the counter circuit 17 supplies a state discrimination signal indicating this U state to the switch control circuit 18. Upon receiving this state discrimination signal indicating the U state, the switch control circuit 18 supplies the signals CNT1 to CNT4 for proceeding to the switch 20 ON state to the corresponding switches.

In the switch 20 ON state, the number of state discrimination transition times of the differential data is smaller than the set value (D state). Therefore, the switch control circuit 18 receives a state discrimination signal indicating this D state and keeps supplying the signals CNT1 to CNT4 for maintaining the switch 20 ON state to the corresponding switches.

Assume that the image data shown in FIG. 16 is input after that. If this is the case, the differential data is almost a repetitive signal of "0" and "1", and EMI again abruptly increases. Since the number of state discrimination transition times of the differential data evidently exceeds the set value, the counter circuit 17 supplies the state discrimination signal indicating the U state to the switch control circuit 18. Upon receiving the state discrimination signal indicating the U state, the switch control circuit 18 supplies the signals CNT1 to CNT4 for proceeding to the switch 21 ON state to the corresponding switches.

In the switch 21 ON state, the number of state discrimination transition times of the differential data is smaller than the set value (D state). Therefore, the switch control circuit 18 receives the state discrimination signal indicating the D state and keeps supplying the signals CNT1 to CNT4 for maintaining the switch 21 ON state to the corresponding switches.

Figure 22:
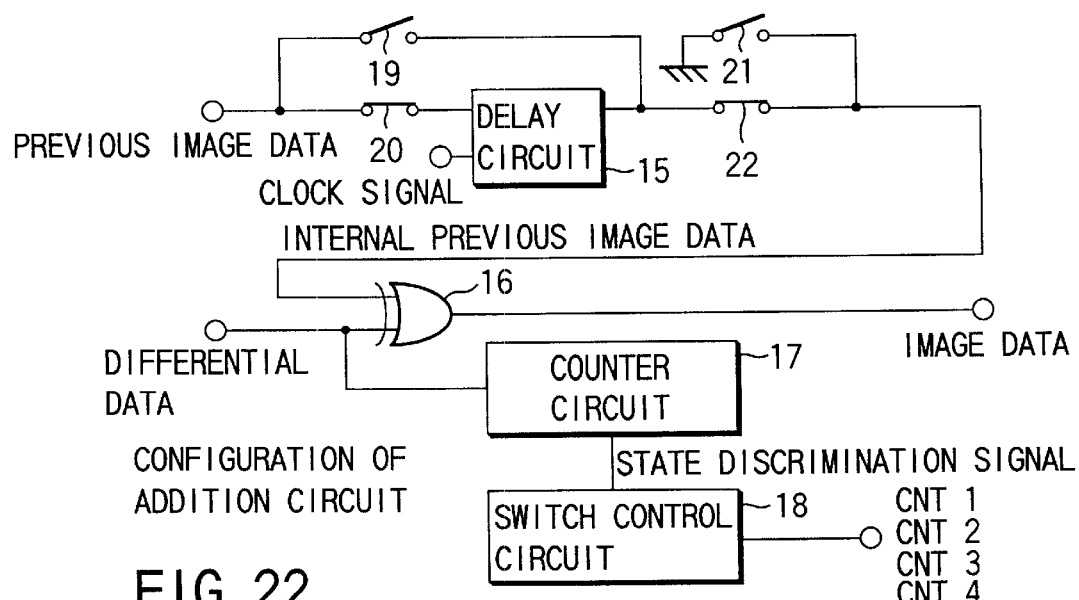
FIG. 22 is a view showing the configuration of an addition circuit according to the third embodiment of the present invention.
Figure 23:
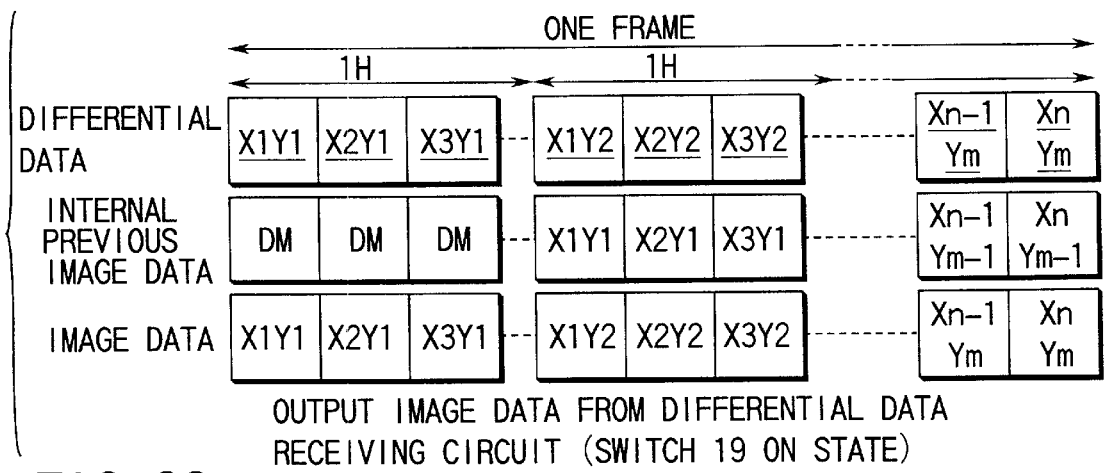
FIG. 23 is a view showing output image data from a differential data receiving circuit according to the third embodiment of the present invention.
Figure 24:
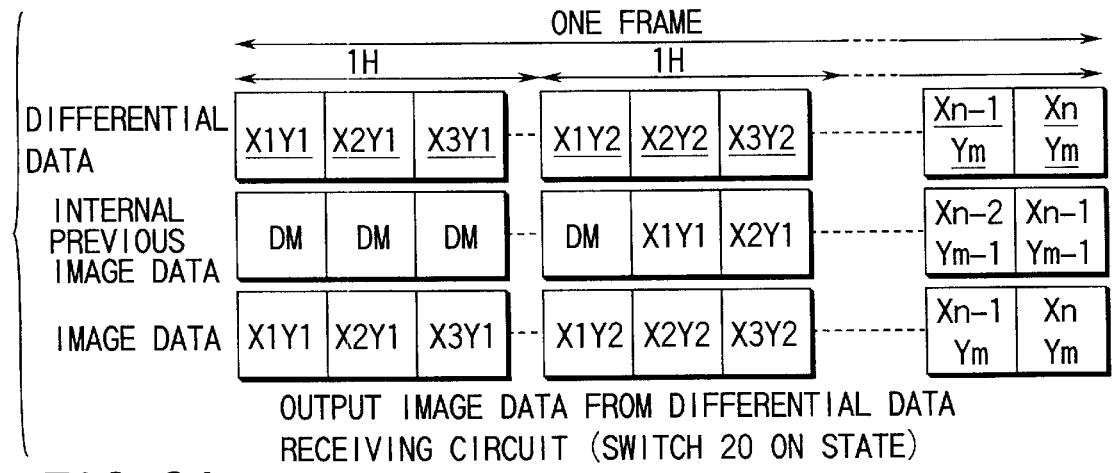
FIG. 24 is a view showing output image data from the differential data receiving circuit according to the third embodiment of the present invention.
Figure 25:
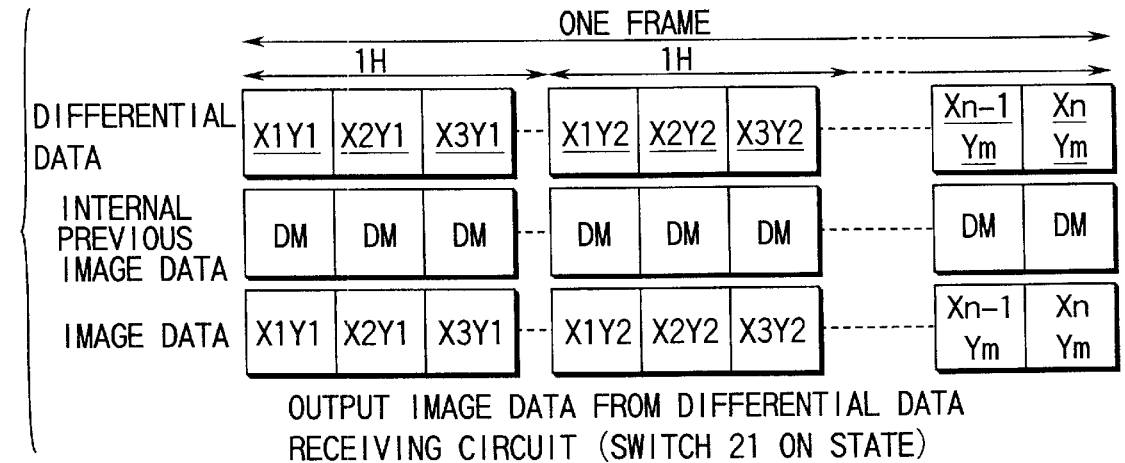
FIG. 25 is a view showing output image data from the differential data receiving circuit according to the third embodiment of the present invention.

A differential data receiving circuit 3 of this embodiment reconstructs the image data from the differential data in accordance with the switch 19 ON state, switch 20 ON state, or switch 21 ON state. FIG. 22 shows a practical configuration of an addition circuit in this differential data receiving circuit 3. FIGS. 23, 24, and 25 show image data outputs corresponding to the switch 19 ON state, switch 20 ON state, and switch 21 ON state, respectively, in the differential data receiving circuit 3.

In this embodiment as described above, it is possible to count the number of transition times of differential data and generate optimum differential data corresponding to image data. So, EMI can be further reduced.

In the first to third embodiments as described above, when image data is transmitted to a display device, differential data is used in a transmission line in which EMI is a problem. Hence, EMI and the circuit power consumption can be reduced with a relatively small-scale circuit configuration.

Fourth Embodiment

This embodiment uses a reset period. In this reset period, previous image data in a differential data transmitting circuit 2 and previous image data in a differential data receiving circuit 3 are forcedly replaced with reset signals.

Figure 26:
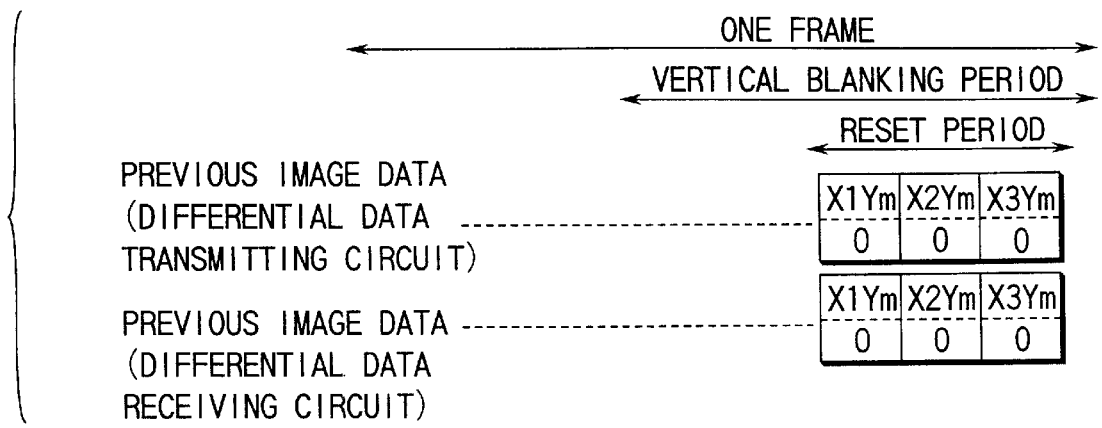
FIG. 26 is a view showing a reset period of previous image data in the fourth embodiment of the present invention.

FIG. 26 shows a practical example of this reset period. The reset period is formed in a vertical blanking period and reset signal is "0". FIG. 26 corresponds to a TFT-LCD having signal lines X1 to X3 and gate lines Y1 to Y3.

Figure 27:
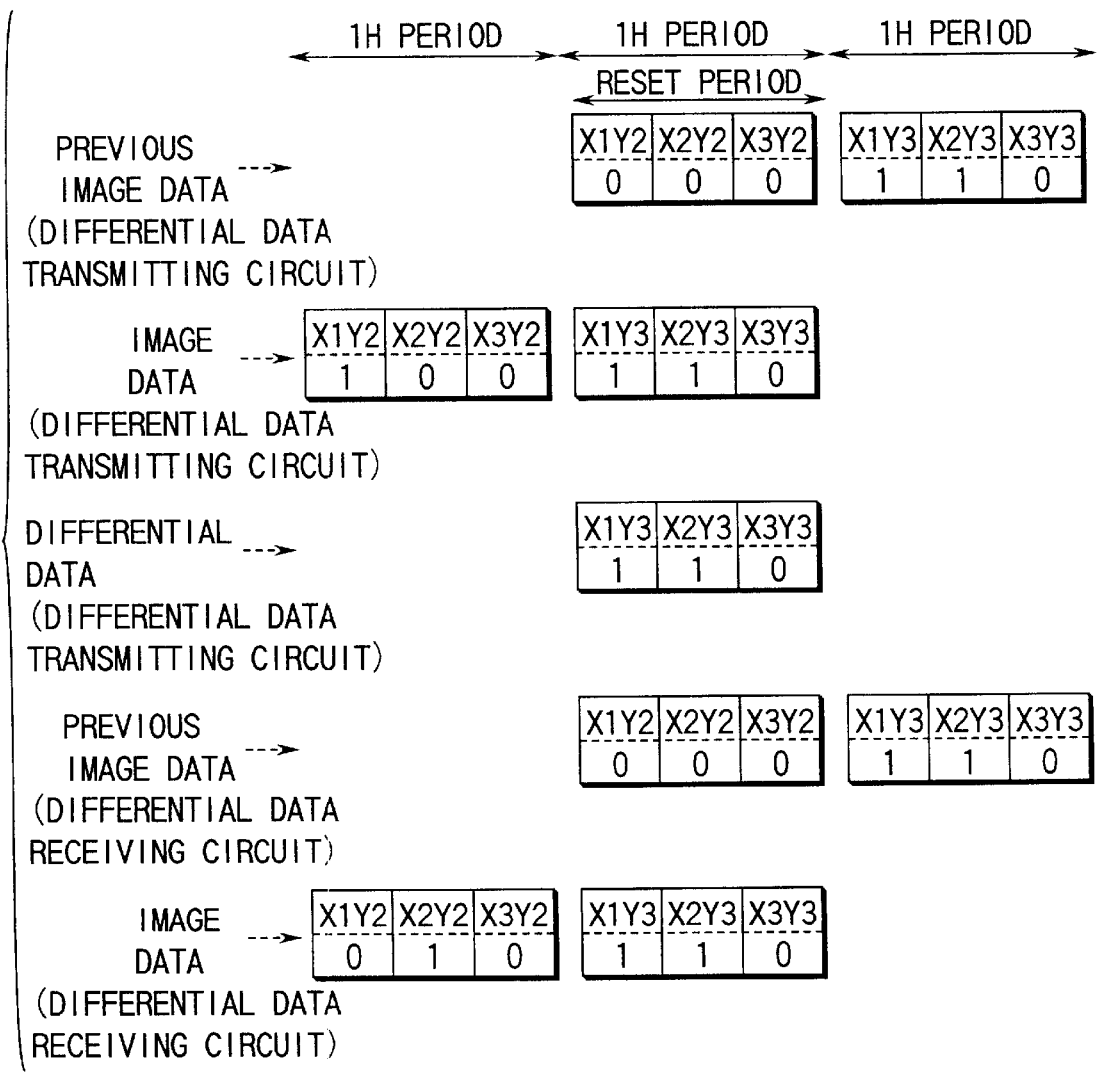
FIG. 27 is a view showing the principle of the reset period in the fourth embodiment of the present invention.

FIG. 27 shows a practical example when the reset signal is "0". This example will be described below.

In FIG. 27, image data in the differential data transmitting circuit and image data in the differential data receiving circuit are different from each other in one scanning line period before the reset period. If this state is left uncorrected, errors are accumulated, so no desired images can be displayed in later periods. This problem readily arises when the power supply is turned on and still unstable.

In the next reset period, therefore, previous image data in the differential data transmitting circuit and previous image data in the differential data receiving circuit are forcedly replaced with reset signals. As a consequence, in this reset period, the previous image data in the differential data transmitting circuit and the previous image data in the differential data receiving circuit are so corrected as to be identical with each other.

Accordingly, it is ensured that the image data reconstructed by the differential data receiving circuit during the reset period is the same data as the image data in the differential data transmitting circuit. Additionally, since a line memory holds the image data as the previous image data, normal operation after that is also ensured.

In the above example, "0" is used as the reset signal (reset data). However, the image data itself can also be used as this reset data.

More specifically, in the reset period, the differential data transmitting circuit transmits the image data itself, instead of the differential data, to the differential data receiving circuit. The differential data receiving circuit outputs the received image data directly as the image data without using an addition circuit. This image data to be used as the reset data is held as previous image data in the line memory of each of the differential data transmitting circuit and the differential data receiving circuit. The period (reset period) during which the image data itself is transmitted is preferably set in every fixed period (preferably, every one or several field periods or every one or several frame periods). Accordingly, even if false image data is transmitted, normal operation can be immediately restored.

In this embodiment, even if an image data error occurs for some reason, the previous image data in the differential data transmitting circuit and differential data receiving circuit are reset to identical data in the reset period. Hence, normal operation can be restored within a short time period.

Fifth Embodiment

This embodiment reduces EMI in accordance with an image pattern by properly switching phase states.

Figure 28:
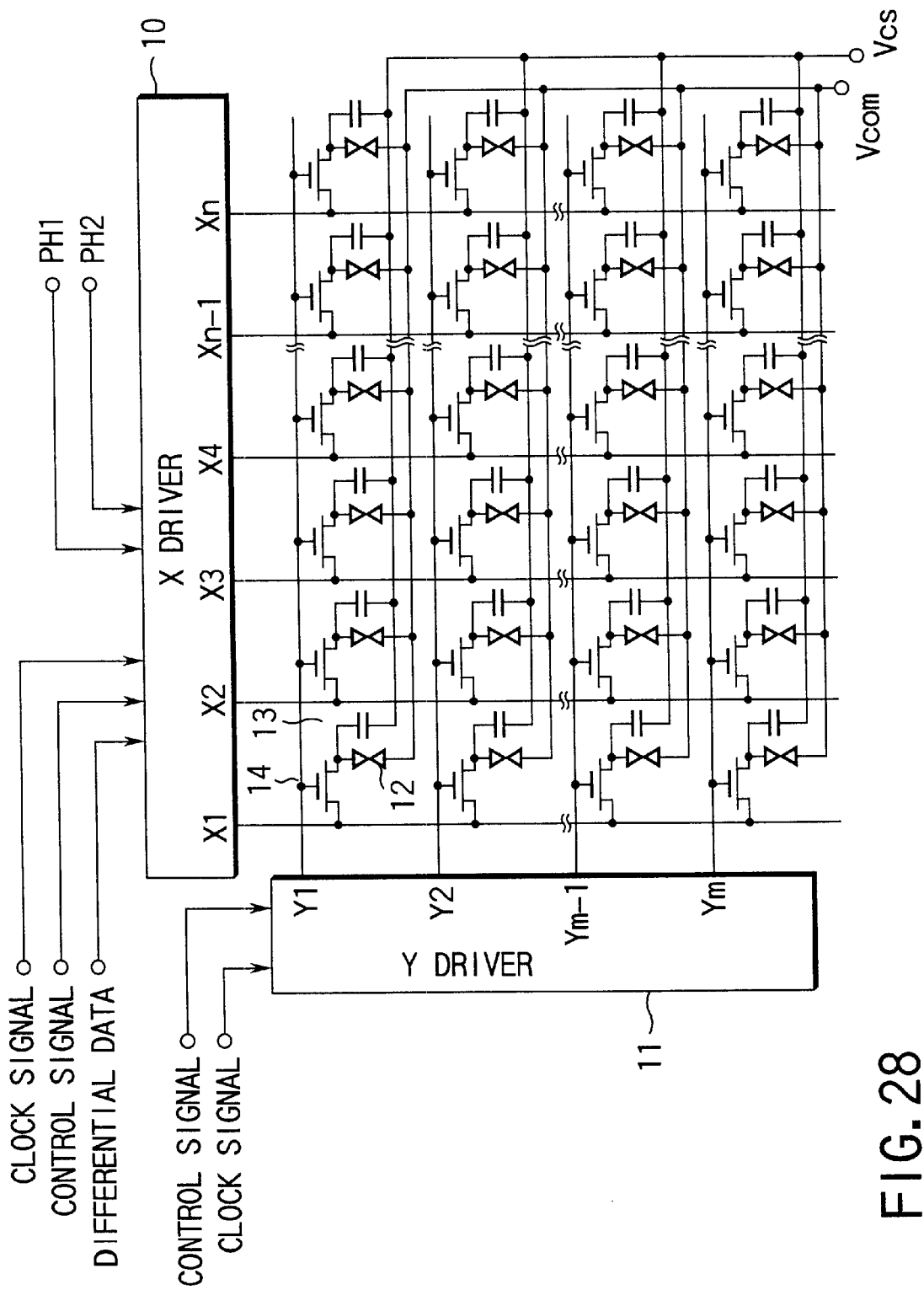
FIG. 28 is a view showing the arrangement of a display panel according to the fifth embodiment of the present invention.

FIG. 28 shows the arrangement of a display panel according to this embodiment. An X driver 10 shown in FIG. 28 basically has the same function as the X driver shown in FIG. 4. That is, this X driver 10 has the function of a differential data receiving circuit and internally reconstructs image data from differential data. Also, the X driver 10 shown in FIG. 28 additionally has a function of suitably switching phase states by PH1 and PH2 (i.e., a function of properly changing the delay period in the delay circuit 15 (FIG. 17) in accordance with image data).

Figures 29, 30:
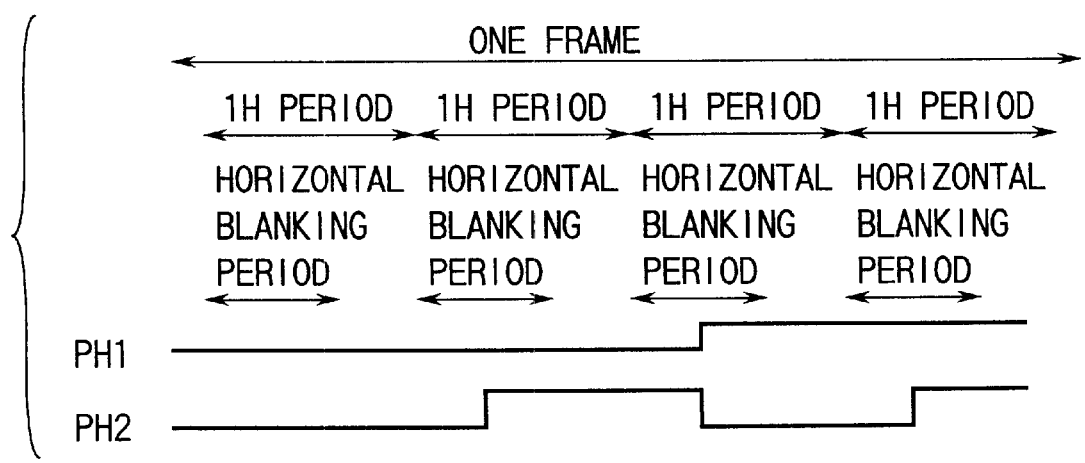
FIG. 29 is a view showing the phase states of image data and previous image data in the fifth embodiment of the present invention.
FIG. 30 is a view showing switching timings of the phase states in the fifth embodiment of the present invention.

FIG. 29 shows the relationship between the phase state, PH1, PH2, image data, and previous image data. The image data and the previous image data shown in FIG. 29 correspond to the same differential data. XsYt indicates data corresponding to an sth signal line and a tth gate line.

FIG. 30 shows phase state switching timings. Referring to FIG. 30, an initial state is phase state (1). In the next horizontal blanking period, PH2 changes to set phase state (3). In the next horizontal blanking period, both PH1 and PH2 change to set phase state (2). In the next horizontal blanking period, phase state (4) appears.

In this embodiment, the phase state can be appropriately changed by PH1 and PH2 in accordance with the number of transition times of differential data. Hence, EMI can be reduced in accordance with an image pattern.

When the operation margin and the EMI reducing effect are taken into consideration, the phase states are switched in desirably the vertical blanking period or the horizontal blanking period, and more desirably, the horizontal blanking period.

Figure 31:
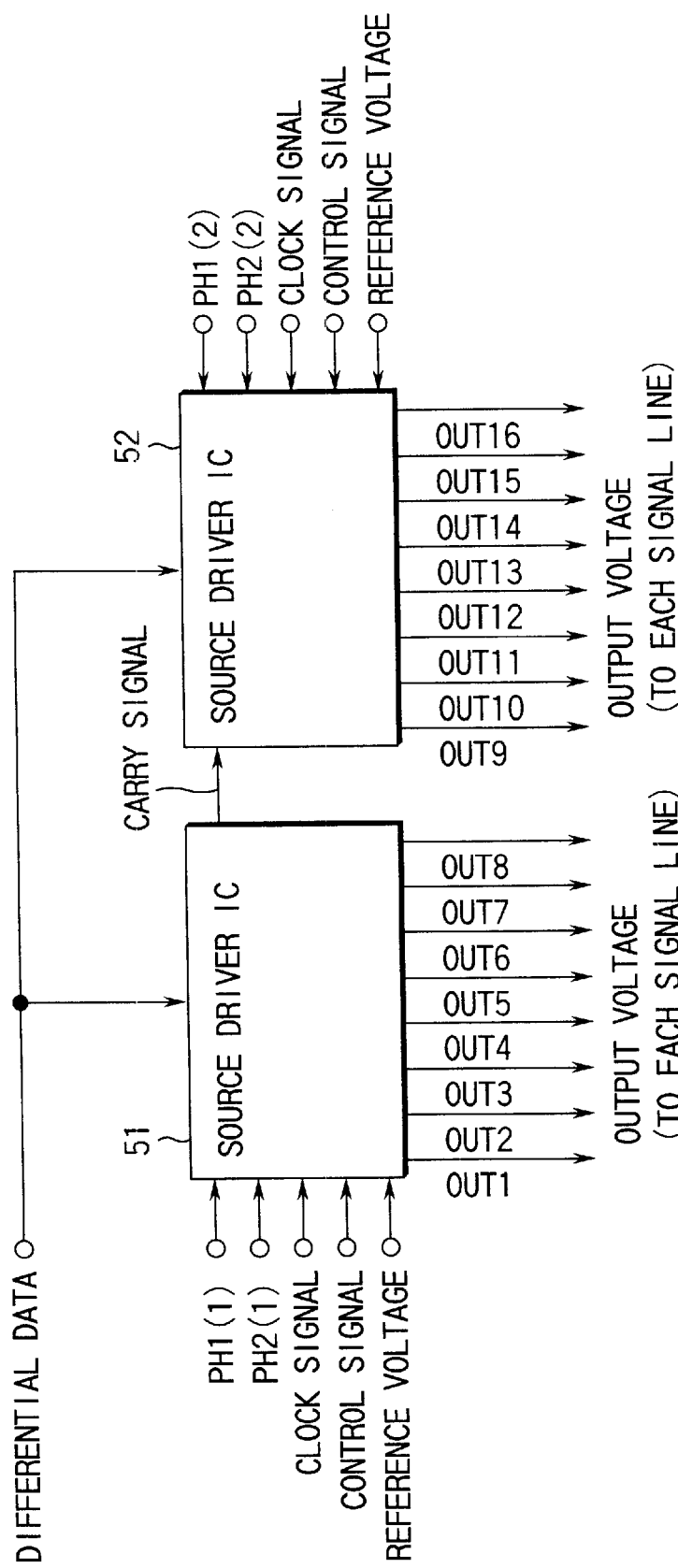
FIG. 31 is a view showing a circuit configuration using source driver ICs in the fifth embodiment of the present invention.

FIG. 31 shows the circuit configuration of this embodiment.

The circuit shown in FIG. 31 has two source driver ICs 51 and 52. These source driver ICs 51 and 52 receive differential data, control signal, clock signal, and the like from, e.g., a gate array, and supplies output signals OUT1 to OUT16 to signal lines of the display panel. The source driver ICs 51 and 52 basically have the same functions as the X driver 10 shown in FIG. 28 and the same arrangement as a source driver IC (to be described later) shown in FIG. 45.

PH1(1) and PH2(l) indicate PH1 and PH2 of the source driver IC 51. PH1(2) and PH2(2) indicate PH1 and PH2 of the source driver IC 52. As described above, PH1 and PH2 are data for determining a phase state.

In this embodiment, the two source driver ICs can be set in different phase states by controlling these ICs by using PH1(1), PH2(1), PH1(2), and PH2(2). In other words, each source driver IC can be optimally set such that the frequency of differential data corresponding to each source driver IC lowers. One practical example will be described below.

The differential data transmitting circuit generates differential data as shown in FIG. 33 with respect to image data as shown in FIG. 32. The phase states of previous image data and the image data are the same from X1 to X8 and different from each other from X8 to X16 (this corresponds to phase state (1)). Accordingly, as shown in FIG. 34, low-frequency differential data is supplied to the source driver ICs 51 and 52.

The source driver ICs 51 and 52 reconstruct the image data from the differential data and generate signal line voltages to be supplied to signal lines. When PH1(1), PH2(1), PH1(2), and PH2(2) are set to "1", "0", "0", and "0", respectively (FIG. 35), during the reconstruction of the image data from the differential data, the source driver IC 51 is set in phase state (2), and the source driver IC 52 is set in phase state (1).

In this embodiment, optimum phase states can be set to the source driver ICs 51 and 52, respectively. Accordingly, optimum differential data having a low frequency can be generated for each block of image data. If the phase states of the two source driver ICs are the same, it is impossible to obtain stationary differential data as shown in FIG. 34. In this embodiment as described above, an optimum phase state can be chosen for each source driver IC, so a better EMI reducing effect can be expected.

Sixth Embodiment

FIG. 36 shows the configuration of a source driver IC in this embodiment.

This source driver IC shown in FIG. 36 has functions of reconstructing image data from differential data, D/A-converting the reconstructed image data, and supplying a signal line voltage obtained by this D/A conversion to a signal line. The source driver IC shown in FIG. 36 is obtained by adding an addition circuit 36 to a conventional source driver IC (source driver described in "Data Book LCD TFT Drivers 1997 (TEXAS INSTRUMENTS)") shown in FIG. 37, and imparting a serial output function to a latch circuit 35 shown in FIG. 37 (a latch circuit 33 with serial output function shown in FIG. 36).

The basic configurations of a shift register circuit 31, latch circuits 32 and 35, and a DAC (D/A converter) circuit 34 shown in FIGS. 36 and 37 are similar to configurations described in, e.g., "Data Book LCD TFT Drivers 1997 (TEXAS INSTRUMENTS)" and "A 64-Gray-Scale Digital Signal Driver for Color TFT-LCDs, SID94 DIGEST pp. 359–362".

The latch circuit 33 with serial output function serially outputs stored image data as previous image data to the addition circuit 36, and also supplies the image data to the DAC circuit 34. The addition circuit 36 reconstructs the image data by exclusively ORing differential data and the input previous image data from the latch circuit 33 with serial output function.

FIG. 38 shows the basic operation of the source driver IC shown in FIG. 36. FIG. 39 shows a practical example of the operation.

The addition circuit 36 exclusively ORs the differential data and the previous image data and serially supplies the image data reconstructed by this exclusive-OR operation to the latch circuit 32. The latch circuit 32 holds the image data serially supplied by a shift pulse from the shift register circuit 31. The image data held in the latch circuit 32 is supplied parallel to the latch circuit 33 with serial output function. The image data supplied to the latch circuit 33 with serial output function is supplied parallel to the DAC circuit 34 and also serially supplied to the addition circuit 36.

In this embodiment, a circuit for reconstructing the image data can be incorporated into a source driver IC without largely changing the structure of the conventional source driver IC.

Also, the latch circuit 33 with serial output function serially supplies the previous image data to the addition circuit 36. Therefore, the number of exclusive-OR circuits in the addition circuit 36 can be the same as the number of bits of the image data. That is, if the number of bits of the image data is 24, the addition circuit 36 can be basically constructed by 24 exclusive-OR circuits. Accordingly, the circuit scale can be decreased. If the previous image data is supplied parallel to the addition circuit 36, at least exclusive-OR circuits equal in number to outputs of the source driver IC are necessary. This increases the circuit scale.

Furthermore, the phase states of the differential data and the previous image data can be adjusted very easily by changing the timing of the serial output from the latch circuit 33 with serial output function by using a control signal.

Seventh Embodiment

FIG. 40 shows a module arrangement in this embodiment. This module has a plurality of source driver ICs.

Differential data, control signal, clock signal, and the like are supplied to source driver ICs 61 and 62. Each source driver IC has an addition circuit and the like and internally reconstructs image data from the differential data.

Figure 41:
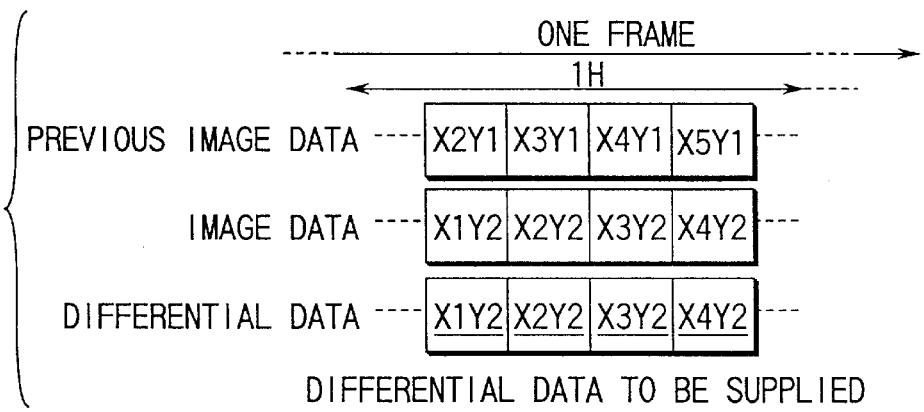
FIG. 41 is a view showing differential data supplied to the module according to the seventh embodiment of the present invention.

These source driver ICs transmit and receive signals with each other (any source driver in reference: "Data Book LCD TFT Drivers 1997 (TEXAS INSTRUMENTS)"). Differential data related to signal lines X1 and X2 is supplied to the source driver IC 61. Differential data related to signal lines X3 and X4 is supplied to the source driver IC 62. When differential data shown in FIG. 41 is input to the module, differential data X1Y2 (the under line shown in FIG. 41 is omitted, and the same shall apply hereinafter) and differential data X2Y2 are supplied to the source driver IC 61. Differential data X3Y2 and differential data X4Y2 are supplied to the source driver IC 62.

Figure 42:
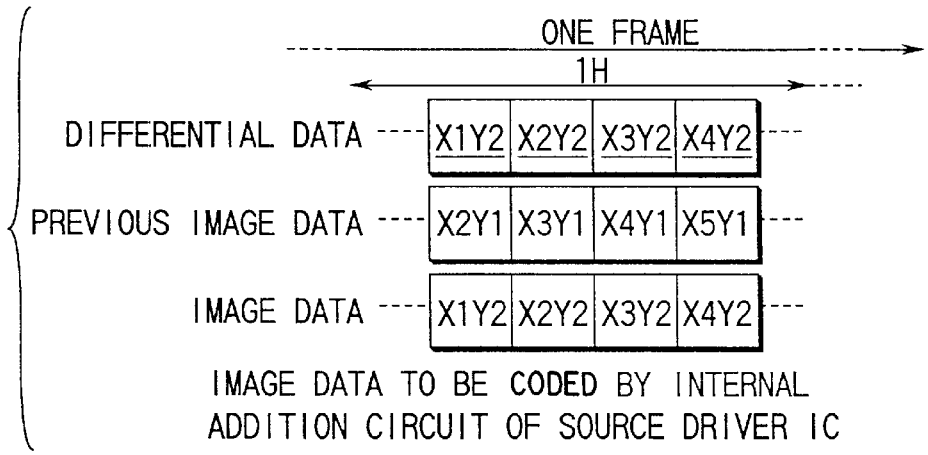
FIG. 42 is a view showing image data reconstructed by an internal addition circuit of the source driver IC according to the seventh embodiment of the present invention.

If a method other than the method of this embodiment is used, the differential data shown in FIG. 41 are reconstructed into the image data as shown in FIG. 42. Referring to FIG. 42, however, the differential data X2Y2 is supplied to the source driver IC 61, previous image data X3Y1 is held in the source driver IC 62. The source driver IC 61 internally reconstructs and holds the image data X2Y2. Therefore, the previous image data X3Y1 held in the source driver IC 62 must be supplied to the source driver IC 61. This requires the formation of wirings outside the source driver ICs.

In this embodiment, on the other hand, to generate differential data from image data related to different signal lines in the module arrangement shown in FIG. 40, dummy data is used instead of image data related to at least one of X2 and X3.

Figure 43:
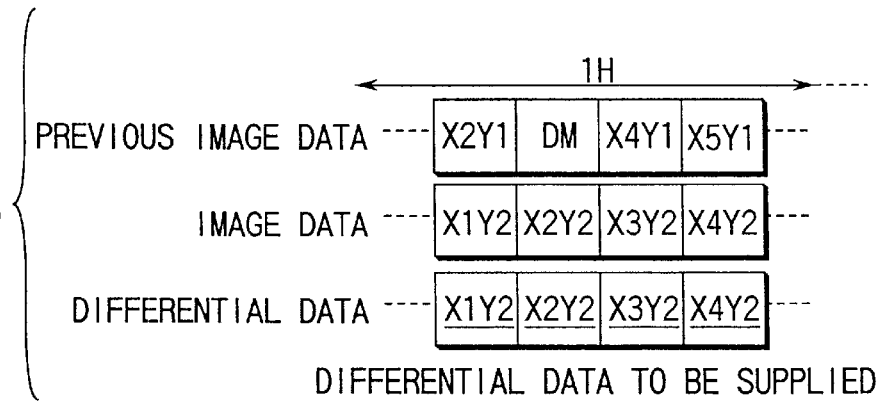
FIG. 43 is a view showing differential data supplied to the module according to the seventh embodiment of the present invention.
Figure 44:
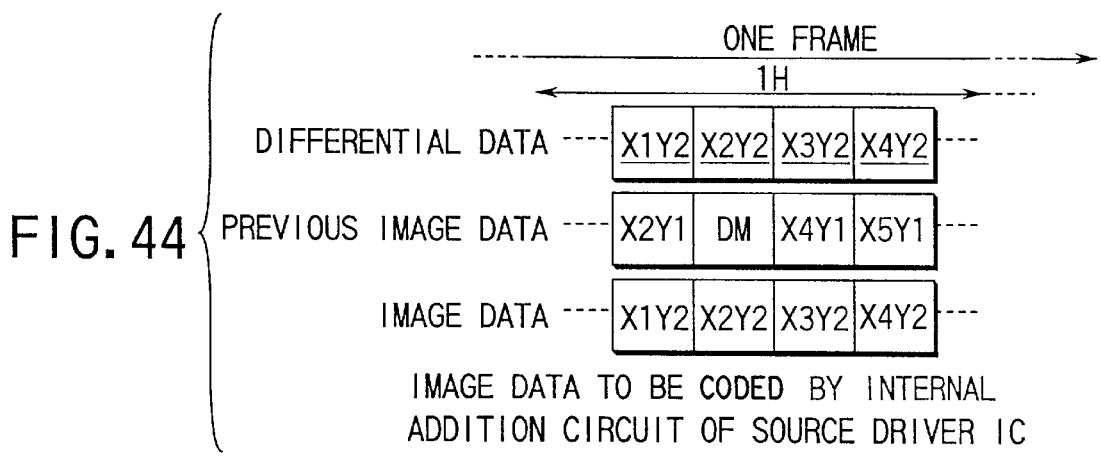
FIG. 44 is a view showing image data reconstructed by the internal addition circuit of the source driver IC according to the seventh embodiment of the present invention.

In the module arrangement shown in FIG. 40, assume that differential data is generated from image data related to a signal line Xn and previous image data related to a signal line Xn+1, and that the image data related to the signal line Xn is generated from differential data related to the signal line Xn and the previous image data related to the signal line Xn+1. If this is the case, dummy data is used instead of the previous image data X3Y1 if the signal lines Xn and Xn+1 are connected to different source driver ICs (FIGS. 43 and 44).

Since the dummy data is used as described above, no wirings need to be formed outside the source driver ICs in order to supply the previous image data X3Y1 held in the source driver IC 62 to the source driver IC 61. Accordingly, the circuit area and circuit scale can be reduced.

Eighth Embodiment

Figure 45:
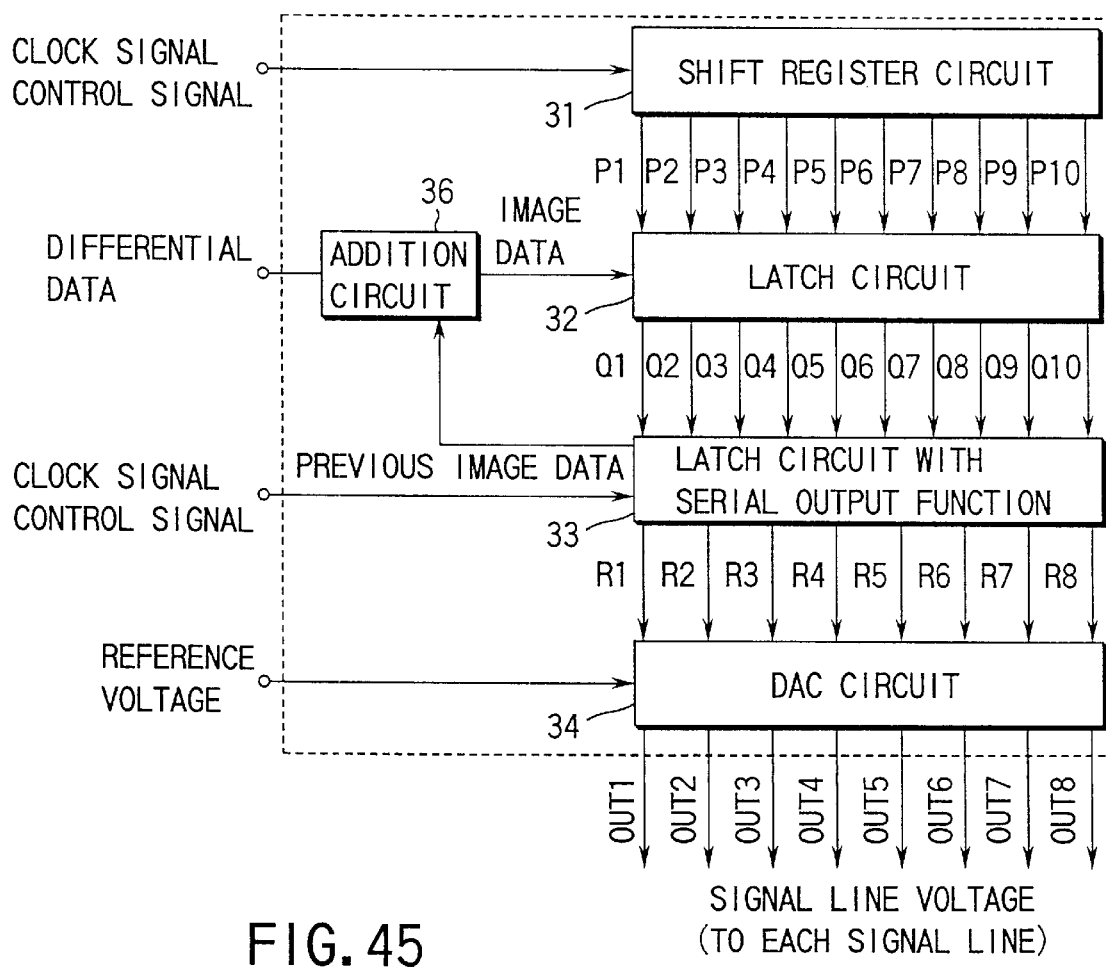
FIG. 45 is a view showing the configuration of a source driver IC according to the eighth embodiment of the present invention.

FIG. 45 shows the configuration of a source driver IC in this embodiment.

The source driver IC according to this embodiment is characterized in that the number of outputs (P1 to P10) of a shift register circuit 31 and the number of outputs (Q1 to Q10) of a latch circuit 32 are larger than the number of outputs (OUT1 to OUT8) of the source driver IC. In other words, the latch circuit 32 and a latch circuit 33 with serial output function hold a larger amount of image data than the amount of image data supplied to a DAC circuit 34.

Figures 46, 47:
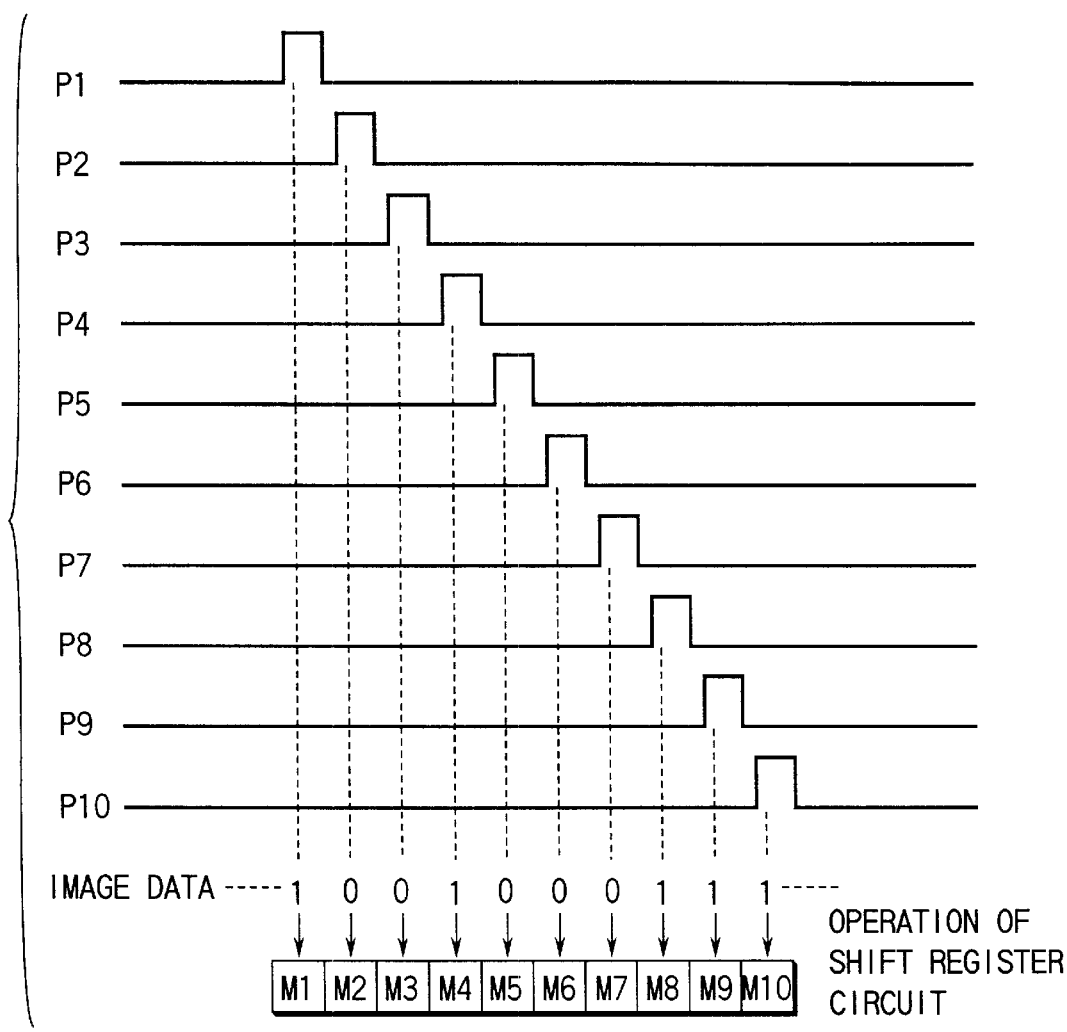
FIG. 46 is a view showing the operation of a shift register circuit according to the eighth embodiment of the present invention.
FIG. 47 is a view showing an output from a latch circuit according to the eighth embodiment of the present invention.

When image data shown in FIG. 46 is serially input to the source driver IC shown in FIG. 45, the image data is held in memories (M1 to M10) of the latch circuit 32 by a shift pulse from the shift register circuit 31. The image data held in the latch circuit 32 is output parallel to the latch circuit 33 with serial output function by a control signal. FIG. 47 shows the output image data. Memories (N1 to N10) in the latch circuit 33 with serial output function hold image data as shown in FIG. 48.

The source driver IC according to this embodiment can serially output any image data held in the memories N1 to N10. Also, the memories N1 to N10 can hold image data related to outputs of another adjacent source driver IC. Accordingly, the image data held in the memories N1 to N10 can be serially output as previous image data in accordance with the timing at which the image data is converted into differential data. This obviates the need to supply previous image data from a different source driver IC even when differential data is to be generated from image data related to a different signal line.

Figures 49, 50:
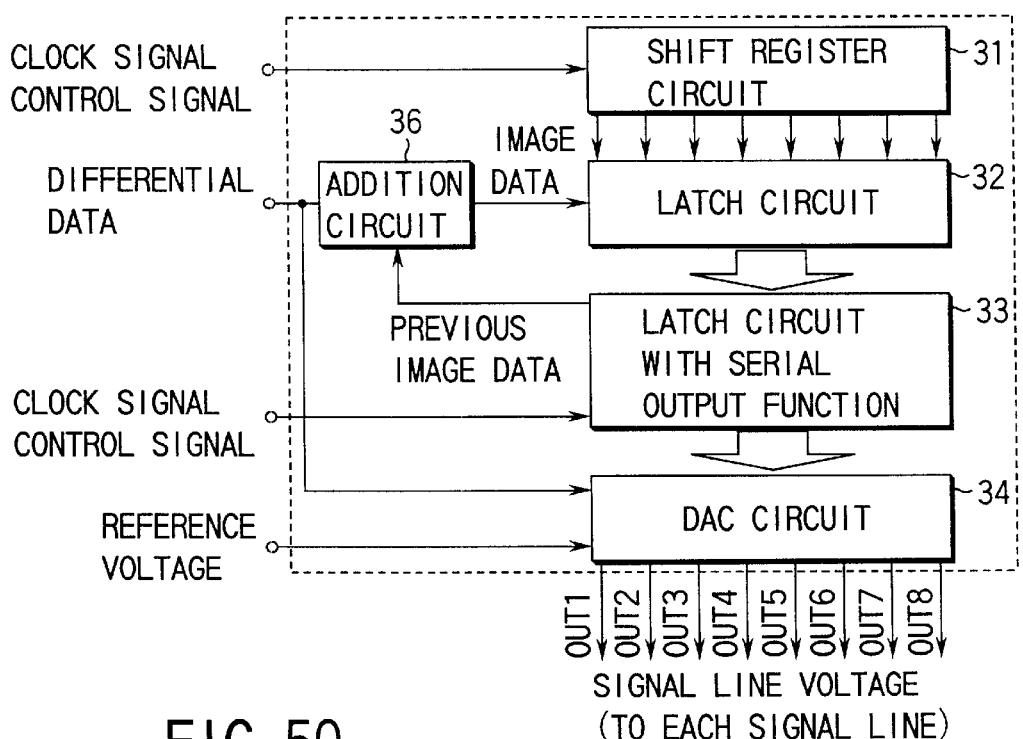
FIG. 49 is a view showing the operation of an addition circuit according to the eighth embodiment of the present invention.
FIG. 50 is a view showing the configuration of a source driver IC according to the ninth embodiment of the present invention.

That is, in this embodiment, when differential data shown in FIG. 49 is input to an addition circuit 36, image data held in Nn+2 can be supplied as previous image data to the addition circuit 36 in accordance with the input timing of differential data related to OUTn (in FIG. 49, (OUTn) indicates differential data corresponding to OUTn, (Nn) indicates previous image data held in Nn, (Xn) indicates image data corresponding to a signal line Xn, and this signal line Xn is connected to an output OUTn of the source driver IC). Therefore, even when differential data is to be generated from the image data related to the signal line Xn and previous image data related to a signal line Xn+2, the image data related to the signal line Xn can be generated from differential data related to the signal line Xn and the previous image data related to the signal line Xn+2 without supplying any previous image data from a different source driver IC.

In this embodiment, a certain source driver IC holds a part of previous image data held in an adjacent source driver IC. This eliminates the need for transmission/reception of previous image data and the like between different source driver ICs. Accordingly, no wirings need to be formed outside the source driver ICs, so the circuit area and circuit scale can be reduced.

In the sixth to eighth embodiments described above, a circuit for reconstructing image data can be incorporated into a source driver IC without largely changing the structure of the conventional source driver IC. Additionally, since previous image data is serially supplied to an addition circuit, the number of exclusive-OR circuits in this addition circuit can be equal to the number of bits of image data. Also, differential data can be generated from image data related to different signal lines by changing the timing of the serial supply of the previous image data to the addition circuit by using a control signal. Furthermore, the circuit area and circuit scale can be reduced because it is unnecessary to transmit and receive the previous image data and the like between different source driver ICs.

Ninth Embodiment

FIG. 50 shows the configuration of a source driver IC of this embodiment. In this source driver IC, differential data is supplied to a DAC circuit (D/A converting circuit) 34. This DAC circuit 34 has a function of changing driving capacity of an output circuit on the basis of the differential data.

Figure 51:
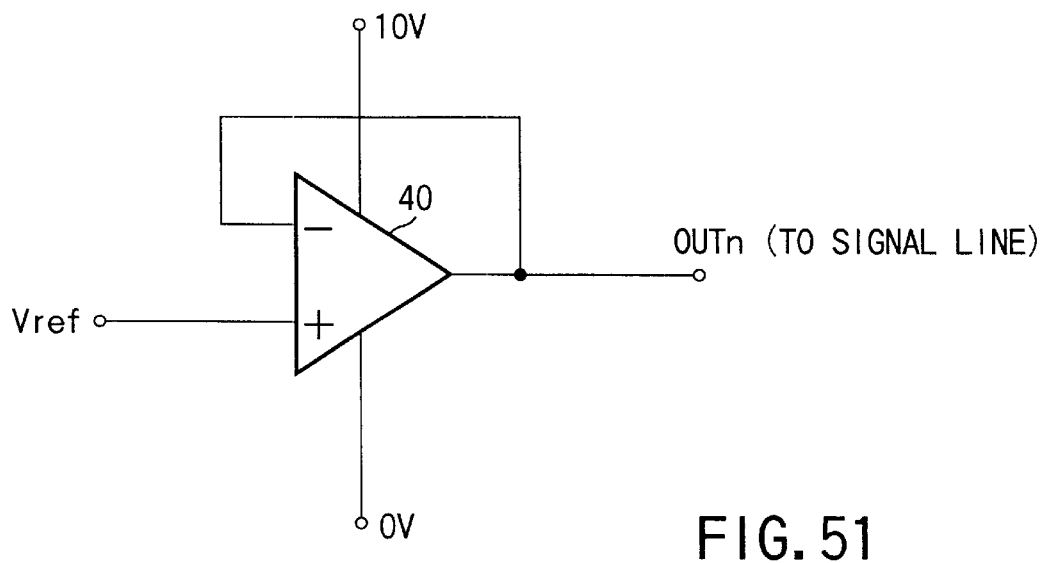
FIG. 51 is a view showing the configuration of an output unit in a DAC circuit according to the ninth embodiment of the present invention.

FIG. 51 shows the configuration of an output circuit corresponding to one signal line in the DAC circuit 34. The output circuit of the DAC circuit 34 is constructed of an operational amplifier 40 (reference: "Low Output Offset, 8 bit Signal Driver ICs for XGA/SVGA TFT-LCDS" T.IEE Japan, Vol. 117-C, No. 8, '97). In this embodiment, a power supply supplies 10V to the operational amplifier 40. Reference symbol Vref denotes a voltage generated on the basis of image data and serving as a reference voltage of a voltage to be supplied to a signal line (reference: "Low Output Offset, 8bit Signal Driver ICs for XGA/SVGA TFT-LCDs" T.IEE Japan, Vol. 117-C, No. 8, '97).

Figure 52:
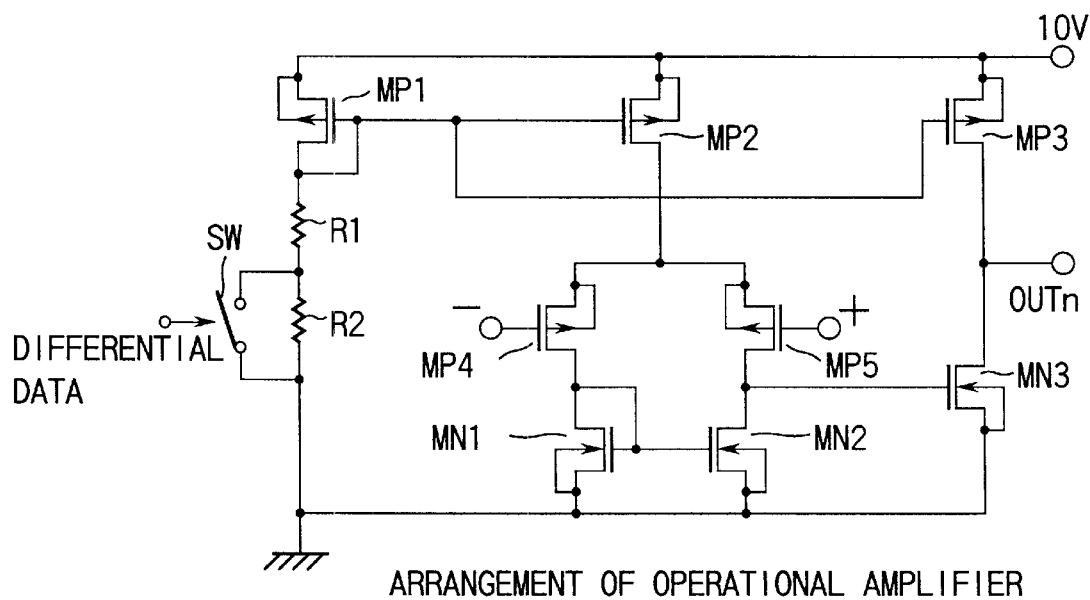
FIG. 52 is a view showing the configuration of an operational amplifier in the output unit of the DAC circuit according to the ninth embodiment of the present invention.

FIG. 52 shows the arrangement of the operational amplifier 40 in this embodiment. Reference symbols MP1 to MP5 denote p-channel transistors; MN1 to MN3, n-channel transistors; R1 and R2, resistors; and SW, a switch to be turned on and off on the basis of the differential data. This operational amplifier shown in FIG. 52 can change the current amounts in MP1, MP2, and MP3 on the basis of the differential data.

To clarify the effect of this embodiment, assume that MP1, MP2, and MP3 are identical transistors (Vth is −2.0V), R1 and R2 are 1 MΩ and 7 MΩ, respectively, one scanning line period is 20 $\mu$sec, and a signal line capacitance is 20 pF.

Figure 53:
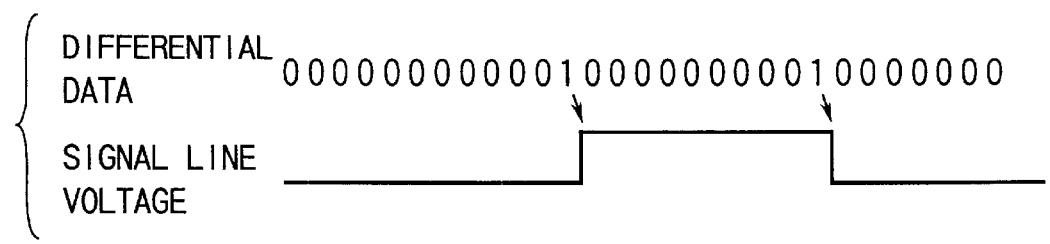
FIG. 53 is a view showing changes in signal line voltage with changes in differential data in the ninth embodiment of the present invention.

If the differential data is "0", SW is OFF, the static currents flowing through MP1, MP2, and MP3 are about 1 $\mu$A, and the consumption power is 30 $\mu$W. To change the signal line voltage by +5V in this state, 100 $\mu$sec (20 pF×5 V/1 $\mu$A) is necessary as a write period. If differential data shown in FIG. 53 is "0", the signal line voltage remains unchanged, so the signal line voltage can be written in a scanning line period (20 $\mu$sec).

If the differential data is "1", SW is ON, the static currents flowing through MP1, MP2, and MP3 are about 8 $\mu$A, and the consumption power is 240 $\mu$W. To change the signal line voltage by +5V in this state, 12.5 $\mu$sec (20 pF×5 V/8 $\mu$A) is satisfactory as a write period. Therefore, even if the signal line voltage changes when the differential data is "1" as shown in FIG. 53, signal line voltage can be normally written within one scanning line period.

In this embodiment as described above, the driving capacity of the operational amplifier is changed on the basis of the differential data. This greatly reduces the static consumption power when the differential data is "0". When the differential data is "0", the signal line voltage remains unchanged, so lowering the driving capacity does not produce any demerit.

This embodiment is particularly effective in a driving method which does not invert the polarity for each scanning line, such as signal line inversion driving method (reference; "Realization of Signal Line Inversion Driving by 5V Driver IC", 1994 Television Society Annual Convention).

10th Embodiment

Figure 54:
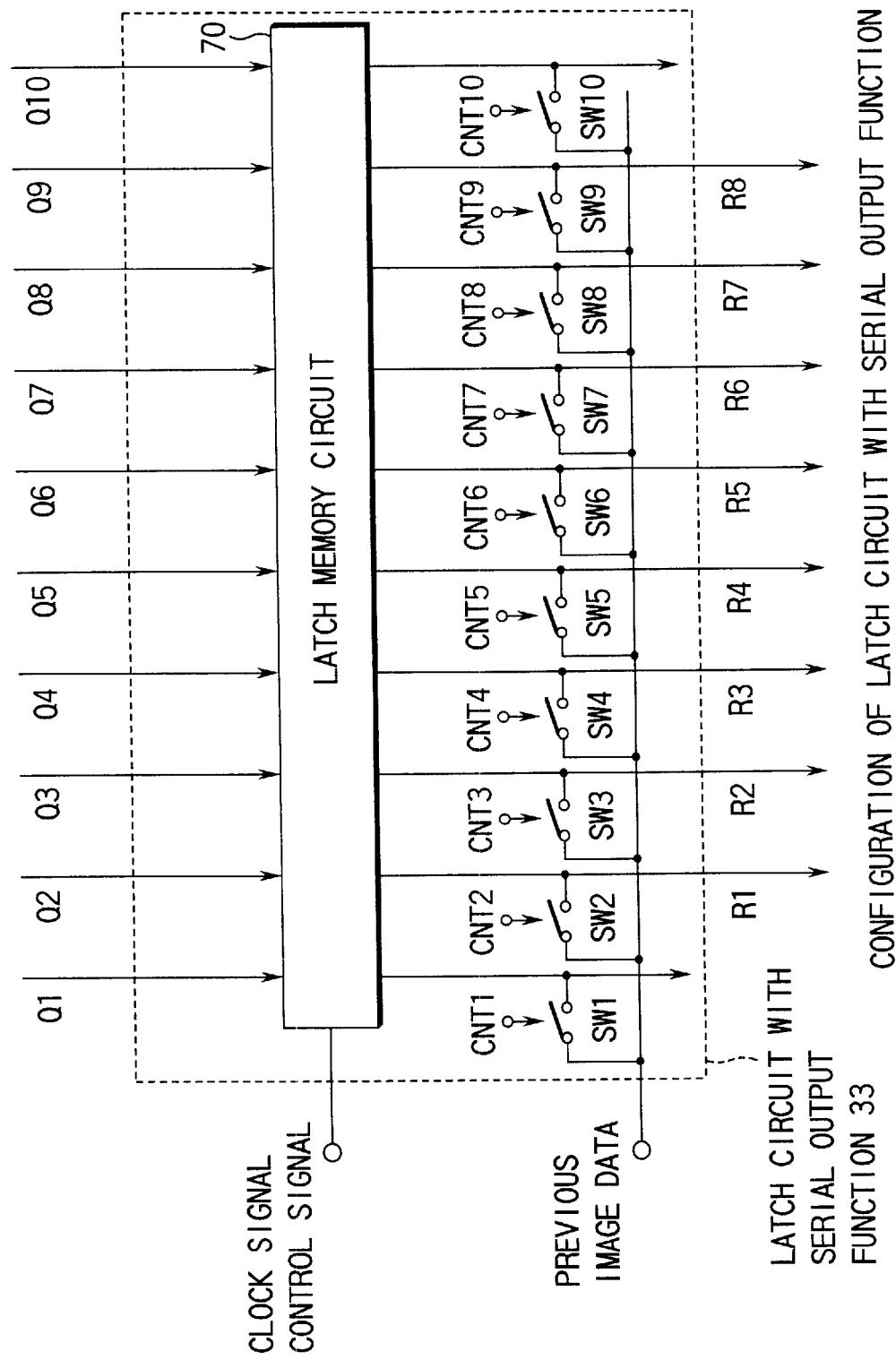
FIG. 54 is a view showing the configuration of a latch circuit with serial output function according to the 10th embodiment of the present invention.

The arrangement shown in FIG. 45 described earlier can be used as a source driver IC in this embodiment. FIG. 54 shows the configuration of a latch circuit 33 with serial function in this source driver IC of the embodiment.

The latch circuit 33 with serial output function shown in FIG. 54 includes a latch memory circuit 70 (constructed by using circuits and the like used in, e.g., HC75A and HC373A of TC74HC series in Data Book) and switches SW1 to SW10 which are ON/OFF-controlled by CNT1 to CNT10.

In this latch circuit 33 with serial output function, the latch memory circuit 70 stores image data Q1 to Q10 supplied from a latch circuit 32, and supplies stored data (R1 to R8) to a DAC circuit 34. Also, the data stored in the latch memory circuit 70 is serially supplied as previous image data to an addition circuit 36 by ON/OFF-controlling the switches SW1 to SW10 by CNT1 to CNT10. These switches SW1 to SW10 are ON when CNT1 to CNT10 are at HIGH level and OFF when CNT1 to CNT10 are at LOW level.

Figure 55:
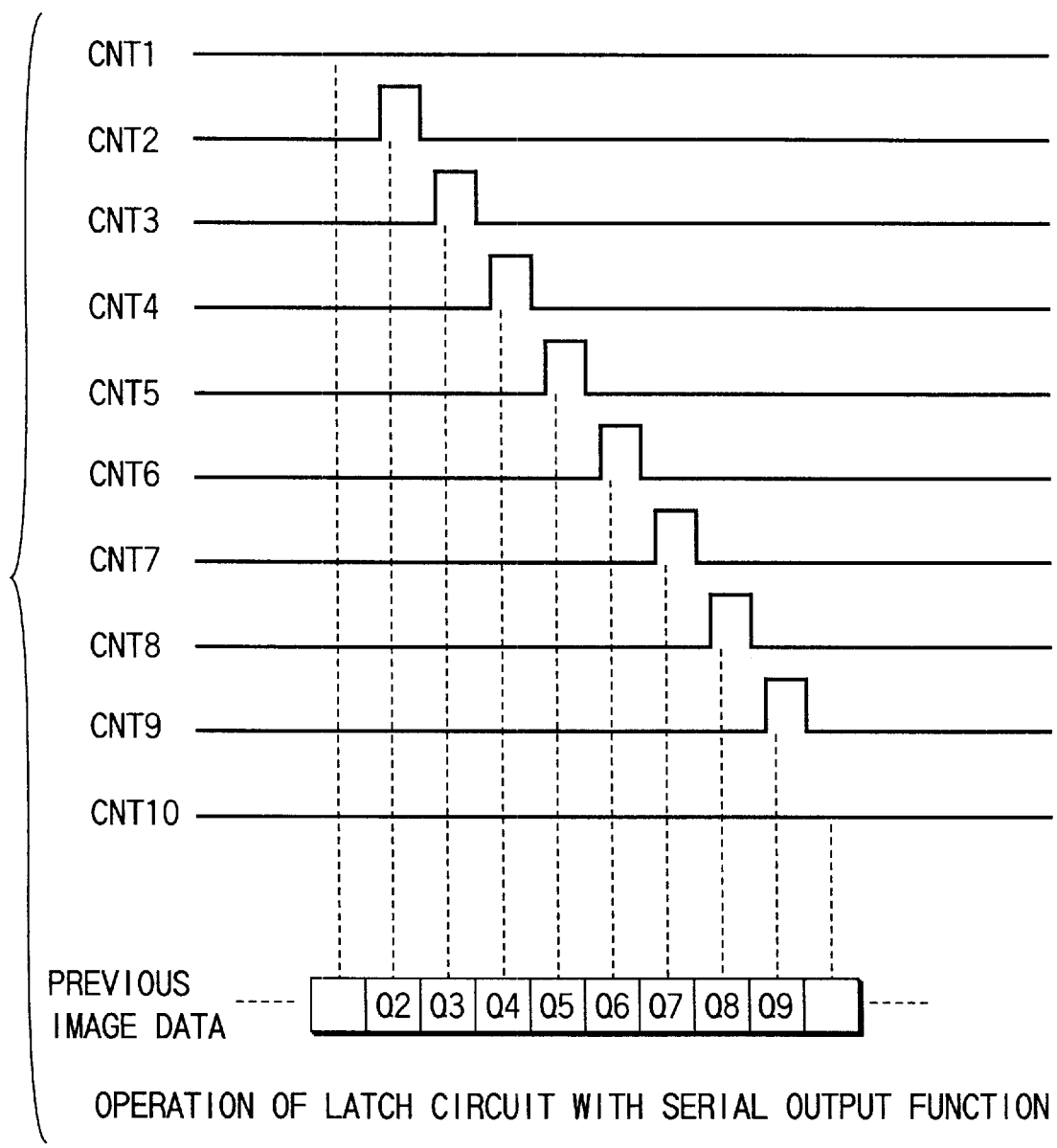
FIG. 55 is a view showing the operation of the latch circuit with serial output function according to the 10th embodiment of the present invention.

FIG. 55 shows the operation of the latch circuit 33 with serial output function. That is, FIG. 55 shows previous image data serially output via SW1 to SW10 which are ON/OFF-controlled by CNT1 to CNT10. Q2 to Q9 in FIG. 55 indicate data corresponding to the data Q2 to Q9 supplied from the latch circuit 32. That is, in FIG. 55, a HIGH-level pulse shifts in the order of CNT2 to CNT9, and SW2 to SW9 are turned on in this order accordingly. Consequently, the serial previous image data shown in FIG. 55 is obtained.

Figure 56:
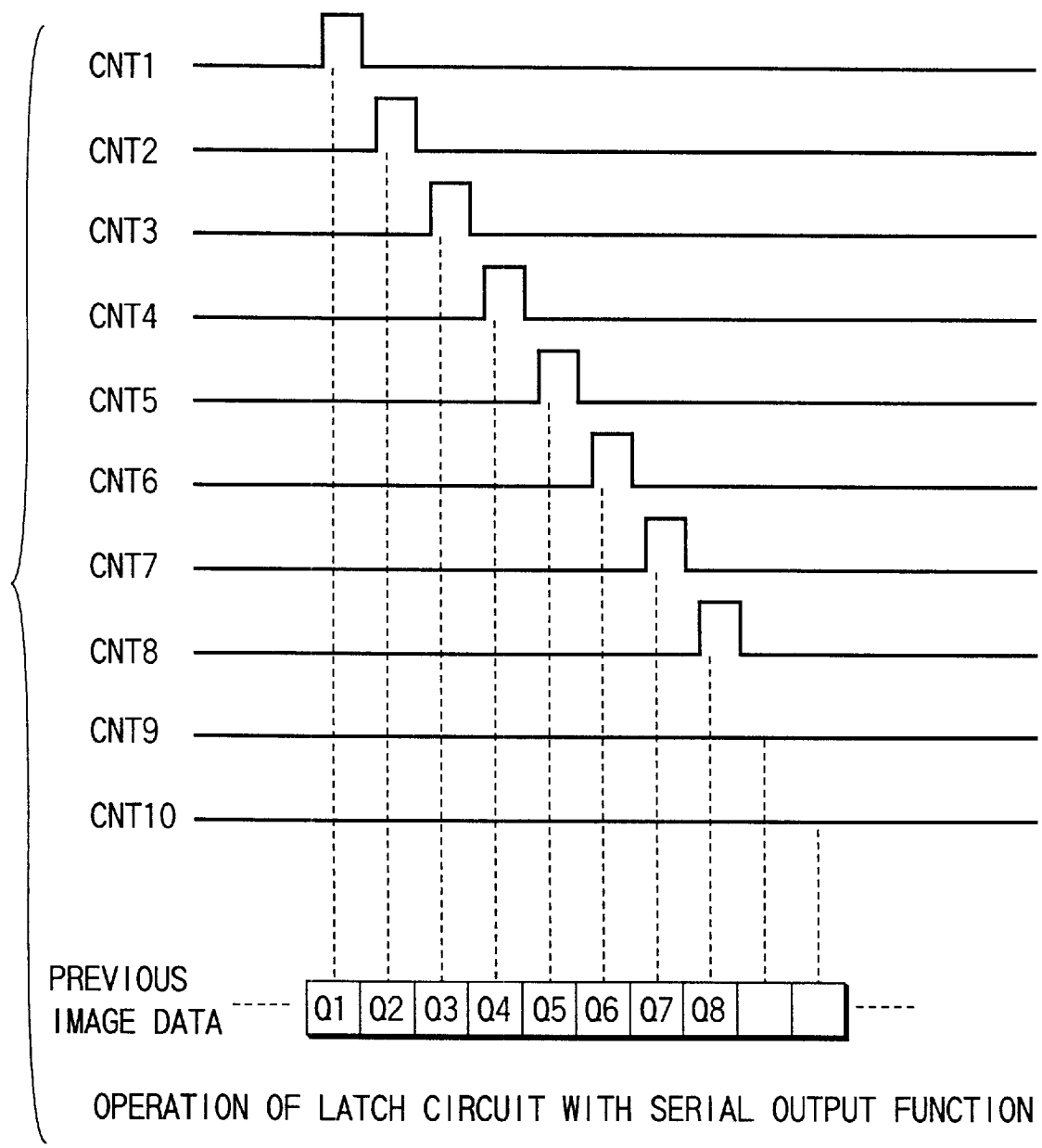
FIG. 56 is a view showing the operation of the latch circuit with serial function output according to the 10th embodiment of the present invention.

Similar to FIG. 55, FIG. 56 shows previous image data serially output via SW1 to SW10 which are ON/OFF-controlled by CNT1 to CNT10. Unlike in FIG. 55, however, a HIGH-level pulse shifts in the order of CNT1 to CNT8, and SW1 to SW8 are turned on in this order accordingly. Consequently, the serial previous image data shown in FIG. 56 is obtained.

As described above, the phases of differential data and previous image data can be adjusted by properly adjusting the HIGH pulse shift timings of CNT1 to CNT10. In this embodiment, therefore, a circuit for reconstructing image data can be incorporated into a source driver IC without largely changing the structure of the conventional source driver IC.

11th Embodiment

In this embodiment, nonlinear conversion corresponding to the generation frequency (generation probability) of each differential data is performed for the differential data, thereby reducing the number of bits of differential data to be transmitted. A practical example of this embodiment will be described below. In the example of this embodiment, nonlinear quantization corresponding to the generation frequency of each differential data is performed for the differential data.

FIG. 57 is a block diagram showing the entire arrangement of an image display device. A printed circuit board 82 is arranged outside a liquid crystal display panel 81. This printed circuit board 82 includes a gate array 83, an X driver 84, a Y driver 85, a data transmission line 86, a clock line 87, and the like.

The gate array 83 performs signal processing for image data and supplies the processed image data to the X driver 84 through the data transmission line 86 on the printed circuit board 82. The printed circuit board 82 generates EMI. To reduce this EMI, the gate array 83 transmits a differential signal having a small number of times of signal change to the X driver 84.

The number of times of signal change is small means that image quality to a certain extent can be maintained even if the number of bits of a signal to be transmitted is reduced. In this embodiment, from this point of view, nonlinear conversion corresponding to the generation frequency of each differential data is performed for the differential data, thereby reducing the number of bits of differential data to be transmitted.

When the number of bits of image data is 24 (8 bits for each of R, G, and B), 24 data transmission lines 86 exist on the printed circuit board 82. Accordingly, a large area on the printed circuit board 82 is occupied by these data transmission lines 86. By reducing the number of the data transmission lines 86, therefore, the area of a so-called frame region (a region of a panel module constructed of the liquid crystal panel 81 and the printed circuit board 82 except for a display region) can be reduced. That is, the screen size can be increased by reducing the number of the data transmission lines 86 without changing the module size.

FIG. 58 shows the statistical generation probability of a differential signal in vertical direction. Letting Ebe the differential signal and $\sigma^2$ be the variance of the differential signal, generation probability P is represented by the following Laplace distribution $$P = 1/\sqrt{2}\sigma \, \exp(-\sqrt{2}|\epsilon|/\sigma)$$

As shown in FIG. 58, the generation probability of a differential signal having zero difference is high. That is, the generation probability of most differential signals is very low. Therefore, nonlinear conversion corresponding to the generation probability is performed for differential data.

FIG. 59 shows the conversion characteristics of differential data when nonlinear conversion is performed. 1-to-1 conversion is performed for differential data having a high generation frequency.

For differential data having a low generation frequency, one differential data (output) corresponds to a plurality of original differential data (input). For example, the correspondences are "0" (input) to "0"(output), "1" (input) to "1" (output), "2" and "3"(input) to "2" (output), and "4", "5", and "6" (input) to "3" (output).

Figure 60:
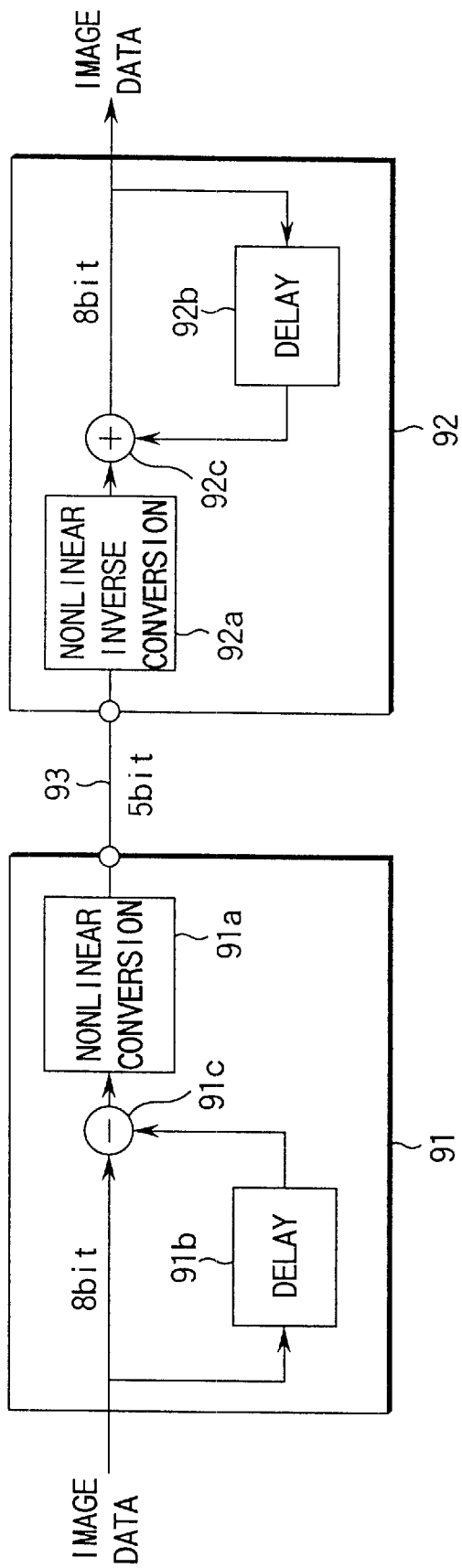
FIG. 60 is a block diagram showing a circuit configuration when nonlinear conversion/nonlinear inverse conversion is performed in the 11th embodiment of the present invention.

FIG. 60 is a block diagram showing a circuit configuration when nonlinear conversion/nonlinear inverse conversion is performed on the basis of the above principle.

A gate array 91 receives 8-bit image data. A subtraction circuit 91c generates 9-bit differential data from previous image data delayed a predetermined period by a delay circuit 91b and the image data. A nonlinear conversion circuit 91a (using a conversion table storing the correspondences between input differential data and output differential data) converts the 9-bit differential data into 5-bit differential data. The 5-bit differential data output from the nonlinear conversion circuit 91a is supplied to an X driver 92 through a data transmission line 93.

A nonlinear inverse conversion circuit 92a (using a conversion table storing the correspondences between input differential data and output differential data) inversely converts the 5-bit differential data input to the X driver 92 into 9-bit differential data. An addition circuit 92c adds the output differential data from the nonlinear inverse conversion circuit 92a to the previous image data held in a delay circuit 92b. In this manner, the addition circuit 92c reconstructs the 8-bit image data.

In this embodiment as described above, nonlinear conversion corresponding to the generation frequency of each differential data is performed for the differential data, thereby reducing the number of bits of differential data to be transmitted. Accordingly, it is possible to reduce the number of data transmission lines and increase the screen size.

In this embodiment, deterioration of the image quality can be decreased by forming a period in which data (9 bits) not subjected to nonlinear conversion is separately transmitted twice (4 bits and 5 bits). It is also possible to make the image quality deterioration difficult to visually confirm by changing the period of this processing in units of fields and thereby moving the image quality deterioration position in units of fields.

Although the embodiments of the present invention have been described above, the present invention is not limited to the above embodiments.

In each of the above embodiments, differential data of image data spatially adjacent to each other (vertically, horizontally, or obliquely) is transmitted and received. However, differential data of image data adjacent to each other with respect to a time base can also be transmitted and received. If this is the case, data obtained by delaying image data by one or several field periods can be used as previous image data.

In each of the above embodiments, a liquid crystal display panel is used as a display panel. However, any display panel other than a liquid crystal display panel can also be used as long as the display panel performs line-sequential scanning.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image data reconstructing device for receiving differential data of previous image data and present image data from a data transmitting section having a subtraction circuit and supplying a signal corresponding to the present image data to a display panel section having a plurality of pixels arranged in a matrix, comprising:

a holding circuit for holding the previous image data to delay the previous image data by a predetermined period; and an addition circuit for performing an adding calculation in which the previous image data from the holding circuit is arithmetically added to the differential data from the data transmitting section to reconstruct the present image data, the differential data being obtained by the subtraction circuit for performing a subtracting calculation in which the previous image data is arithmetically subtracted from the present image data or the present image data is arithmetically subtracted from the previous image data.

2. A device according to claim 1, further comprising a delay period control circuit for changing delay period of the previous image data in accordance with a variation in a logic state of the differential data received from the data transmitting section.

3. A device according to claim 1, wherein the holding circuit and the addition circuit are integrated in a source driver IC for supplying a signal corresponding to the present image data reconstructed by the addition circuit to the pixel of the display panel section, and the holding circuit serially supplies the previous image data to the addition circuit.

4. A device according to claim 1, wherein the image data reconstructing device has a plurality of source drive ICs for supplying a signal corresponding to the present image data reconstructed by the addition circuit to the pixel of the display panel section, and the holding circuit and the addition circuit are integrated in each of the source driver ICs, and dummy data is used, instead of the previous image data, when the previous image data to be supplied to the addition circuit integrated in one of the source driver IC is held by the holding circuit integrated in another source driver IC, to reconstruct the present image data by the addition circuit.

5. A device according to claim 1, wherein the holding circuit and the addition circuit are integrated in a source driver IC for supplying a signal corresponding to the present image data reconstructed by the addition circuit to the pixel of the display panel section, and the source driver IC holds at least one of the previous image data held by another source driver IC.

6. A device according to claim 1, further comprising:

a supply circuit for supplying a signal corresponding to the present image data reconstructed by the addition circuit to the pixel of the display panel section; and a switching circuit for switching a driving capacity of the supply circuit in accordance with the differential data received from the data transmitting section.

7. A device according to claim 1, wherein the image data reconstructing device is constructed such that specific data is used instead of the previous image data in a specific period, and the specific data is the same as data used instead of the previous image data in a specific period in the data transmitting section.

8. A device according to claim 1, wherein the differential data received from the data transmitting section is obtained by performing nonlinear conversion corresponding to generation frequency of each of original differential data for the original differential data, and the number of bits of the differential data is less than the number of bits of the original differential data, and the image data reconstructing device further comprises a conversion circuit for performing nonlinear inverse conversion corresponding to the generation frequency of each of the original differential data for the differential data received from the data transmitting section, thereby increasing the number of bits of the received differential data.

9. A device according to claim 1, wherein delay period of the previous image data delayed by the holding circuit is one scanning period.

10. An image display device comprising:

(a) a data transmitting section having a first holding circuit for holding previous image data to delay the previous image data by a predetermined period, and a subtraction circuit for performing a subtracting calculation in which the previous image data from the first holding circuit is arithmetically subtracted from present image data or the present image data is arithmetically subtracted from the previous image data to generate differential data of the previous image data and the present image data;

(b) a data receiving section having a second holding circuit for holding the previous image data to delay the previous image data by a predetermined period, and an addition circuit for performing an adding calculation in which the previous image data from the second holding circuit is arithmetically added to the differential data from the data transmitting section to reconstruct the present image data; and (c) a display panel section having a plurality of pixels arranged in a matrix, the display panel section receiving a signal corresponding to the present image data reconstructed by the addition circuit.

11. A liquid crystal display device comprising:

(a) a data transmitting section having a first holding circuit for holding previous image data to delay the previous image data by a predetermined period, and a subtraction circuit for performing a subtracting calculation in which the previous image data from the first holding circuit is arithmetically subtracted from present image data or the present image data is arithmetically subtracted from the previous image data to generate differential data of the previous image data and the present image data;

(b) a data receiving section having a second holding circuit for holding the previous image data to delay the previous image data by a predetermined period, and an addition circuit for performing an adding calculation in which the previous image data from the second holding circuit is arithmetically added to the differential data from the data transmitting section to reconstruct the present image data; and (c) a liquid crystal display panel section raving a plurality of pixels arranged in a matrix, and transmittance of the pixel being controlled on the basis of a signal corresponding to the present image data reconstructed by the addition circuit.

12. A device according to claim 11, wherein the second holding circuit and the addition circuit are integrated in a source driver IC for supplying the signal corresponding to the present image data reconstructed by the addition circuit to the pixel of the liquid crystal display panel section, and the second holding circuit serially supplies the previous image data to the addition circuit.

13. A device according to claim 11, wherein the data receiving section has a plurality of source drive ICs for supplying a signal corresponding to the present image data reconstructed by the addition circuit to the pixel of the liquid crystal display panel section, and the second holding circuit and the addition circuit are integrated in each of the source driver ICs, and dummy data is used, instead of the previous image data, when the previous image data to be supplied to the addition circuit integrated in one of the source driver IC is held by the holding circuit integrated in another source driver IC, to reconstruct the present image data by the addition circuit.

14. A device according to claim 11, wherein the second holding circuit and the addition circuit are integrated in a source driver IC for supplying the signal corresponding to the present image data reconstructed by the addition circuit to the pixel of the liquid crystal display panel section, and the source driver IC holds at least one of the previous image data held by another source driver IC.

15. A device according to claim 11, wherein the data receiving section further comprises:

a supply circuit for supplying the signal corresponding to the present image data reconstructed by the addition circuit to the pixel of the liquid crystal display panel section; and a switching circuit for switching driving capacity of the supply circuit in accordance with the differential data received from the data transmitting section.

* * * * *